(12) United States Patent
Barsalou et al.

(10) Patent No.: US 12,131,194 B2
(45) Date of Patent: Oct. 29, 2024

(54) TECHNIQUES FOR DETECTING DRIFT IN A DEPLOYMENT ORCHESTRATOR

(71) Applicant: Oracle International Corporation, Redwood Shores, CA (US)

(72) Inventors: Eric Tyler Barsalou, Seattle, WA (US); Nathaniel Martin Glass, Seattle, WA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/340,335

(22) Filed: Jun. 23, 2023

(65) Prior Publication Data

US 2023/0350731 A1    Nov. 2, 2023

Related U.S. Application Data

(63) Continuation of application No. 17/834,378, filed on Jun. 7, 2022, now Pat. No. 11,726,830, which is a
(Continued)

(51) Int. Cl.
*G06F 9/50* (2006.01)
*G06F 3/0484* (2022.01)
(Continued)

(52) U.S. Cl.
CPC .......... *G06F 9/5061* (2013.01); *G06F 3/0484* (2013.01); *G06F 8/60* (2013.01);
(Continued)

(58) Field of Classification Search
CPC ...................................................... G06F 9/485
See application file for complete search history.

(56) References Cited

U.S. PATENT DOCUMENTS 7,277,967 B2    10/2007    Kao et al.
8,429,253 B1 *   4/2013    Wiggins ................ G06F 16/119
                                                        713/1
(Continued)

FOREIGN PATENT DOCUMENTS

JP    2013522729 A    6/2013
JP    2018045372 A    3/2018
JP    2019518270 A    6/2019

OTHER PUBLICATIONS

AGS Data Diode Technical Requirements Programmatic Requirements, Accessed from internet on Dec. 20, 2019, 3 pages.
(Continued)

*Primary Examiner* — Charlie Sun
(74) *Attorney, Agent, or Firm* — Kilpatrick Townsend & Stockton LLP

(57) ABSTRACT

Techniques for implementing an infrastructure orchestration service are described. A safety plan comprising a list of resources and operations based at least in part on a deployment configuration file can be received. Upon receiving approval of the safety plan, an operation corresponding to at least one of the list of resources can be prepared to be performed. The operation can be compared to the safety plan. If the operation is part of the safety plan, the operation can be performed. If the operation is not part of the safety plan, the deployment can be halted, and a notification that the deployment is not in compliance with the safety plan can be transmitted.

20 Claims, 13 Drawing Sheets

Related U.S. Application Data continuation of application No. 17/027,527, filed on Sep. 21, 2020, now Pat. No. 11,397,619.

(60) Provisional application No. 62/963,452, filed on Jan. 20, 2020, provisional application No. 62/963,486, filed on Jan. 20, 2020, provisional application No. 62/963,335, filed on Jan. 20, 2020, provisional application No. 62/963,489, filed on Jan. 20, 2020, provisional application No. 62/963,491, filed on Jan. 20, 2020, provisional application No. 62/963,477, filed on Jan. 20, 2020, provisional application No. 62/963,413, filed on Jan. 20, 2020, provisional application No. 62/963,456, filed on Jan. 20, 2020, provisional application No. 62/963,480, filed on Jan. 20, 2020, provisional application No. 62/963,481, filed on Jan. 20, 2020, provisional application No. 62/963,478, filed on Jan. 20, 2020.

(51) Int. Cl.

| | | |
|---|---|---|
| *G06F 8/60* | (2018.01) | |
| *G06F 8/71* | (2018.01) | |
| *G06F 9/38* | (2018.01) | |
| *G06F 9/4401* | (2018.01) | |
| *G06F 9/445* | (2018.01) | |
| *G06F 9/451* | (2018.01) | |
| *G06F 9/48* | (2006.01) | |
| *G06F 11/07* | (2006.01) | |
| *G06F 11/14* | (2006.01) | |
| *G06F 11/32* | (2006.01) | |
| *G06F 11/36* | (2006.01) | |
| *G06F 16/901* | (2019.01) | |
| *H04L 41/0806* | (2022.01) | |
| *H04L 41/0816* | (2022.01) | |
| *H04L 41/50* | (2022.01) | |
| *H04L 41/5041* | (2022.01) | |
| *H04L 41/5054* | (2022.01) | |
| *H04L 67/00* | (2022.01) | |
| *H04L 67/10* | (2022.01) | |
| *H04L 67/1008* | (2022.01) | |
| *H04L 67/1031* | (2022.01) | |
| *H04L 67/566* | (2022.01) | |
| *G06F 8/61* | (2018.01) | |

(52) U.S. Cl.
CPC .............. *G06F 8/71* (2013.01); *G06F 9/3836* (2013.01); *G06F 9/4411* (2013.01); *G06F 9/44505* (2013.01); *G06F 9/451* (2018.02); *G06F 9/485* (2013.01); *G06F 9/4856* (2013.01); *G06F 9/5011* (2013.01); *G06F 9/5022* (2013.01); *G06F 9/5027* (2013.01); *G06F 9/5038* (2013.01); *G06F 9/505* (2013.01); *G06F 9/5072* (2013.01); *G06F 9/5077* (2013.01); *G06F 11/0757* (2013.01); *G06F 11/1469* (2013.01); *G06F 11/327* (2013.01); *G06F 11/3664* (2013.01); *G06F 11/3684* (2013.01); *G06F 16/9024* (2019.01); *H04L 41/0806* (2013.01); *H04L 41/0816* (2013.01); *H04L 41/5041* (2013.01); *H04L 41/5048* (2013.01); *H04L 41/5054* (2013.01); *H04L 41/5096* (2013.01); *H04L 67/10* (2013.01); *H04L 67/1008* (2013.01); *H04L 67/1031* (2013.01); *H04L 67/34* (2013.01); *H04L 67/566* (2022.05); *G06F 8/61* (2013.01); *G06F 11/0709* (2013.01); *G06F 11/0751* (2013.01); *G06F 11/0793* (2013.01)

(56) References Cited

U.S. PATENT DOCUMENTS

| | | |
|---|---|---|
| 8,458,301 B1 | 6/2013 | Andrus et al. |
| 8,478,845 B2 | 7/2013 | Agarwala et al. |
| 9,612,815 B1 | 4/2017 | Jagtap et al. |
| 9,727,315 B2 | 8/2017 | Sharma et al. |
| 9,876,703 B1 | 1/2018 | Arllen et al. |
| 10,511,675 B1 | 12/2019 | Chud |
| 11,321,137 B2 | 5/2022 | Barsalou et al. |
| 11,321,138 B2 | 5/2022 | Glass |
| 11,397,619 B2 | 7/2022 | Barsalou et al. |
| 11,726,830 B2 | 8/2023 | Barsalou et al. |
| 11,816,507 B2 | 11/2023 | Barsalou et al. |
| 2006/0080656 A1 | 4/2006 | Cain et al. |
| 2007/0101204 A1 | 5/2007 | Chen et al. |
| 2008/0120617 A1 | 5/2008 | Keller et al. |
| 2008/0134297 A1 | 6/2008 | Clinick et al. |
| 2009/0112646 A1 | 4/2009 | Bruce et al. |
| 2010/0257403 A1 | 10/2010 | Virk et al. |
| 2010/0281456 A1 | 11/2010 | Eizenman et al. |
| 2012/0096457 A1 | 4/2012 | Gupta et al. |
| 2013/0232463 A1 | 9/2013 | Nagaraja et al. |
| 2013/0232497 A1 | 9/2013 | Jalagam et al. |
| 2013/0232498 A1 | 9/2013 | Mangtani et al. |
| 2014/0189084 A1 | 7/2014 | Kamenetsky et al. |
| 2015/0100969 A1 | 4/2015 | Clark et al. |
| 2015/0312274 A1 | 10/2015 | Bishop et al. |
| 2015/0341240 A1 | 11/2015 | Iyoob et al. |
| 2016/0092526 A1 | 3/2016 | Kothari et al. |
| 2016/0335454 A1 | 11/2016 | Choe et al. |
| 2016/0371079 A1 | 12/2016 | Balasubramanian et al. |
| 2016/0378615 A1 | 12/2016 | Cohen et al. |
| 2017/0054816 A1 | 2/2017 | Brummet et al. |
| 2017/0063615 A1 | 3/2017 | Yang et al. |
| 2017/0161104 A1 | 6/2017 | Johnson et al. |
| 2017/0329590 A1 | 11/2017 | Owen et al. |
| 2018/0011697 A1 | 1/2018 | Berkebile et al. |
| 2018/0157512 A1 | 6/2018 | Savov et al. |
| 2018/0165122 A1 | 6/2018 | Dobrev |
| 2018/0309623 A1 | 10/2018 | Szobi et al. |
| 2019/0050213 A1 | 2/2019 | Schanafelt et al. |
| 2019/0122156 A1 | 4/2019 | Asthana et al. |
| 2019/0138289 A1 | 5/2019 | Advani et al. |
| 2019/0171966 A1 | 6/2019 | Rangasamy |
| 2019/0213115 A1 | 7/2019 | Takawale et al. |
| 2019/0220321 A1 | 7/2019 | Yang |
| 2019/0278928 A1 | 9/2019 | Rungta et al. |
| 2020/0014607 A1 | 1/2020 | Gangadhar et al. |
| 2020/0034206 A1 | 1/2020 | Dimitrov et al. |
| 2020/0220848 A1 | 7/2020 | Patwardhan |
| 2020/0244527 A1 | 7/2020 | Sharma et al. |
| 2020/0285462 A1 | 9/2020 | Sabath et al. |
| 2020/0293382 A1 | 9/2020 | Ivancich et al. |
| 2021/0019193 A1 | 1/2021 | Ffrench et al. |
| 2021/0056466 A1 | 2/2021 | Ortyl, III et al. |
| 2021/0126825 A1 | 4/2021 | Darden et al. |
| 2022/0052916 A1 | 2/2022 | Fedida et al. |

OTHER PUBLICATIONS

AGS Technical Design, Accessed from internet on Dec. 20, 2019, 13 pages.
Configuring the SDK for JavaScript- AWS SDK for JavaScript, Amazon Web Services, Incorporation, Accessed from Internet on Jun. 11, 2021, 7 pages.
Design Details, Accessed from internet on Dec. 20, 2019, 5 pages.
Disconnected Region Support, Accessed from Internet on Dec. 20, 2019, 15 pages.
Shepherd Business Case and Executive Summary, Accessed from internet on Dec. 20, 2019, 33 pages.
Shepherd Capabilities Service: Cross-Flock Coordination, Accessed from Internet on Dec. 20, 2019, 5 pages.
Shepherd Regional, Accessed from internet on Dec. 20, 2019, 4 pages.
Shepherd Regional Control Plane, Accessed from Internet on Dec. 20, 2019, 4 pages.

(56) References Cited

OTHER PUBLICATIONS

Shepherd Regional Executor Service, Accessed from internet on Dec. 20, 2019, 15 pages.
Terraform Yield, Accessed from internet on Dec. 20, 2019, 6 pages.
U.S. Appl. No. 16/925,108, Non-Final Office Action mailed on Apr. 12, 2022, 12 pages.
U.S. Appl. No. 16/925,108, Notice of Allowance mailed on Jul. 20, 2022, 7 pages.
U.S. Appl. No. 17/008,102, Final Office Action mailed on Sep. 22, 2021, 23 pages.
U.S. Appl. No. 17/008,102, First Action Interview Office Action Summary mailed on Jun. 23, 2021, 7 pages.
U.S. Appl. No. 17/008,102, First Action Interview Pilot Program Pre-Interview Communication mailed on Apr. 30, 2021, 7 pages.
U.S. Appl. No. 17/008,102, Notice of Allowance mailed on Jan. 12, 2022, 13 pages.
U.S. Appl. No. 17/016,802, First Action Interview Office Action Summary mailed on Sep. 17, 2021, 3 pages.
U.S. Appl. No. 17/016,802, First Action Interview Pilot Program Pre-Interview Communication mailed on Jul. 16, 2021, 5 pages.
U.S. Appl. No. 17/016,802, Notice of Allowability mailed on Feb. 16, 2022, 6 pages.
U.S. Appl. No. 17/016,802, Notice of Allowance mailed on Jan. 25, 2022, 9 pages.
U.S. Appl. No. 17/027,507, Final Office Action mailed on May 18, 2023, 10 pages.
U.S. Appl. No. 17/027,507, First Action Interview Office Action Summary mailed on Jan. 12, 2023, 12 pages.
U.S. Appl. No. 17/027,507, First Action Interview Pilot Program Pre-interview Communication mailed on Aug. 25, 2022, 11 pages.
U.S. Appl. No. 17/027,507, Notice of Allowance mailed on Aug. 2, 2023, 10 pages.
U.S. Appl. No. 17/027,527, Non-Final Office Action mailed on Mar. 4, 2022, 6 pages.
U.S. Appl. No. 17/027,527, Notice of Allowance mailed on Apr. 22, 2022, 5 pages.
U.S. Appl. No. 17/103,733, Final Office Action mailed on Mar. 11, 2022, 22 pages.
U.S. Appl. No. 17/103,733, Non-Final Office Action mailed on Sep. 9, 2021, 12 pages.
U.S. Appl. No. 17/103,733, Notice of Allowance mailed on Sep. 9, 2022, 7 pages.
U.S. Appl. No. 17/834,378, Corrected Notice of Allowability mailed on Jul. 19, 2023, 2 pages.
U.S. Appl. No. 17/834,378, Notice of Allowance mailed on Mar. 27, 2023, 9 pages.
U.S. Appl. No. 18/373,743, Non-Final Office Action mailed on Jul. 31, 2024, 36 pages.
Application No. JP2022-543748, Notice of Decision to Grant mailed on Aug. 6, 2024, 3 pages.
Application No. PCT/US2020/062290, International Preliminary Report on Patentability mailed on Apr. 8, 2022, 7 pages.
Application No. PCT/US2020/062290, International Search Report and Written Opinion mailed on Mar. 26, 2021, 11 pages.
Application No. PCT/US2020/062290, Written Opinion of the International Preliminary Examining Authority mailed on Oct. 6, 2021, 5 pages.
Application No. PCT/US2021/013585, International Preliminary Report on Patentability mailed on Aug. 4, 2022, 9 pages.
Application No. PCT/US2021/013585, International Search Report and Written Opinion mailed on Apr. 23, 2021, 12 pages.
Sarma et al., "Palantir: Early Detection of Development Conflicts Arising from Parallel Code Changes", Institute of Electrical and Electronics Engineers Transactions on Software Engineering, vol. 38, No. 4, Jul.-Aug. 2012, pp. 889-908.
Servant et al., "CASI: Preventing Indirect Conflicts Through a Live Visualization", Proceedings of the 2010 Indian Certificate of Secondary Education Workshop on Cooperative and Human Aspects of Software Engineering, May 2010, pp. 39-46.

* cited by examiner

TECHNIQUES FOR DETECTING DRIFT IN A DEPLOYMENT ORCHESTRATOR

CROSS-REFERENCE TO RELATED APPLICATIONS

The present application is a continuation of, and claims the benefit and priority to U.S. application Ser. No. 17/834,378, filed Jun. 7, 2022, entitled "TECHNIQUES FOR DETECTING DRIFT IN A DEPLOYMENT ORCHESTRATOR," which claims the benefit and priority to U.S. Ser. No. 17/027,527, filed Sep. 21, 2020, entitled "TECHNIQUES FOR DETECTING DRIFT IN A DEPLOYMENT ORCHESTRATOR," which is a non-provisional application of, and claims the benefit and priority under 35 U.S.C. 119(e) of the following U.S. Provisional Applications, the entire contents of which is incorporated by reference for all purposes:

U.S. Provisional Application No. 62/963,413, filed Jan. 20, 2020, entitled "TECHNIQUES FOR DETECTING DRIFT IN A DEPLOYMENT ORCHESTRATOR";

U.S. Provisional Application No. 62/963,335, filed Jan. 20, 2020, entitled "TECHNIQUES FOR DEPLOYING INFRASTRUCTURE RESOURCES WITH A DECLARATIVE PROVISIONING TOOL";

U.S. Provisional Application No. 62/963,456, filed Jan. 20, 2020, entitled "USER INTERFACE TECHNIQUES FOR AN INFRASTRUCTURE ORCHESTRATION SERVICE";

U.S. Provisional Application No. 62/963,477, filed Jan. 20, 2020, entitled "TECHNIQUES FOR UTILIZING DIRECTED ACYCLIC GRAPHS FOR DEPLOYMENT INSTRUCTIONS";

U.S. Provisional Application No. 62/963,478, filed Jan. 20, 2020, entitled "TECHNIQUES FOR RESOLVING APPLICATION UPDATES";

U.S. Provisional Application No. 62/963,480, filed Jan. 20, 2020, entitled "TECHNIQUES FOR MANAGING DEPENDENCIES OF AN ORCHESTRATION SERVICE";

U.S. Provisional Application No. 62/963,452, filed Jan. 20, 2020, entitled "TECHNIQUES FOR ROLLBACK OF AN INFRASTRUCTURE ORCHESTRATION SERVICE";

U.S. Provisional Application No. 62/963,486 filed Jan. 20, 2020, entitled "TECHNIQUES FOR DEPLOYING INFRASTRUCTURE COMPONENTS IN PHASES";

U.S. Provisional Application No. 62/963,489, filed Jan. 20, 2020, entitled "TECHNIQUES FOR MANAGING LONG-RUNNING TASKS WITH A DECLARATIVE PROVISIONER";

U.S. Provisional Application No. 62/963,481, filed Jan. 20, 2020, entitled "TECHNIQUES FOR TRANSFERRING DATA ACROSS AIR GAPS"; and U.S. Provisional Application No. 62/963,491, filed Jan. 20, 2020, entitled "TECHNIQUES FOR PREVENTING CONCURRENT EXECUTION OF DECLARATIVE INFRASTRUCTURE PROVISIONERS".

This application is also related to application Ser. No. 17/027,507, filed on Sep. 21, 2020, entitled "TECHNIQUES FOR MANAGING DRIFT IN A DEPLOYMENT ORCHESTRATOR," the entire contents of which is hereby incorporated by reference as if fully set forth herein, under 35 U.S.C. § 120.

BACKGROUND

Today, cloud infrastructure services utilize many individual services to provision and deploy code and configuration (respectively) across the cloud infrastructure service's many regions. These tools require significant manual effort to use, especially given that provisioning is generally declarative and deploying code is imperative. Additionally, as the number of service teams and regions grows, the cloud infrastructure service will need to continue to grow. Some cloud infrastructure service's strategies of deploying to a larger number of smaller regions includes per-region expenditures, which may not scale well.

BRIEF SUMMARY

Techniques for implementing an infrastructure orchestration service are described. In some examples, a safety plan comprising a list of resources and operations based at least in part on a deployment configuration file can be received. Upon receiving approval of the safety plan, an operation corresponding to at least one of the list of resources can be prepared to be performed. The operation can be compared to the safety plan. If the operation is determined to be part of the safety plan, the operation can be performed. If the operation is determined to not part of the safety plan, the deployment can be halted, and a notification that the deployment is not in compliance with the safety plan can be transmitted. In some examples, the operation may not be part of the safety plan if drift has occurred.

In other examples, a computer-readable storage medium can include instructions that when executed by a processor can cause the processor to perform various operations described herein. A safety plan can be received which can include a list of resources and operations based on a deployment configuration file. An approval of the safety plan can be received. An operation corresponding to at least one of the list of resources according to the deployment configuration file can be prepared to be performed. The operation can be compared to the safety plan. If the operation is determined to be part of the safety plan, the operation can be performed. If the operation is determined to not be part of the safety plan, the deployment can be halted, and a notification that the deployment is not in compliance with the safety plan can be transmitted.

In further examples, a system can include a processor and a memory that can store instructions that, when executed by the processor, can configure the system to perform operations described herein. A safety plan can be received which can comprise a list of resources and operations based at least in part on a deployment configuration file. An approval of the safety plan can be received. Based on the approval, an operation corresponding to at least one of the list of resources can be prepared to be performed. The operation can be compared to the safety plan. If the operation is determined to be part of the safety plan, the operation can be performed. If the operation is determined to not be part of the safety plan, the deployment can be halted, and a notification that the deployment is not in compliance with the safety plan can be transmitted.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
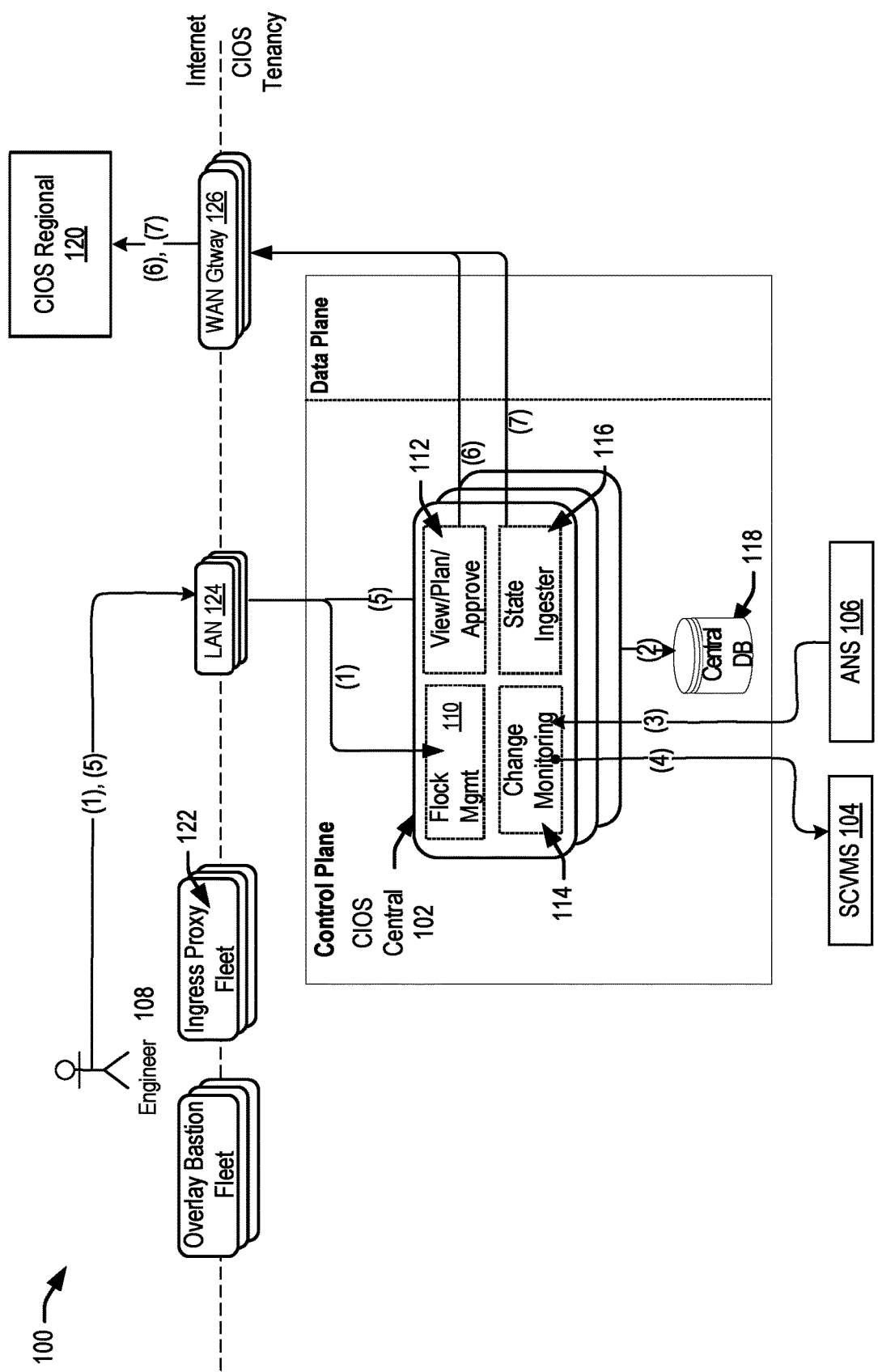
FIG. 1 is a block diagram of an architecture for implementing at least some elements of a cloud infrastructure orchestration service, according to at least one embodiment.

In some examples, infrastructure as a service (IaaS) is one particular type of cloud computing. IaaS can be configured to provide virtualized computing resources over a public network (e.g., the Internet). In some examples, IaaS is one of the three main categories (or sub-categories) of cloud computing services. Most consider the other main categories to be software as a service (SaaS) and platform as a service (PaaS), and sometimes SaaS may be considered a broader category, encompassing both PaaS and IaaS, with even some considering IaaS to be a sub-category of PaaS as well.

In an IaaS model, a cloud computing provider can host the infrastructure components (e.g., servers, storage devices, network nodes (e.g., hardware), deployment software, platform virtualization (e.g., a hypervisor layer), or the like).

In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) in each VM, deploy middleware, such as databases, create storage buckets for workloads and backups, and install even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., selling) IaaS. An entity might also opt to deploy a private cloud, becoming its own provider of infrastructure services.

In some examples, IaaS deployment is the processes of putting a new application, or a new version, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

As noted above, one way to provision the infrastructure is to describe it declaratively. As such, the configuration file may be a declarative file that merely describes each of the infrastructure components noted above and how they interact. The configuration file can describe the resource and the relevant fields needed to create the element, and then as other elements can be described that reference the previously described elements. In some examples, a provisioning tool can then generate a workflow for creating and managing the elements that are described in the configuration file.

In some instances, the workflow of the provisioning tool may be configured to perform various commands. One function that can be performed is view reconciliation, where the provisioning tool can compare the view of the current infrastructure (e.g., the expected state of the infrastructure) with how the infrastructure is actually running. In some instances, performing the view reconciliation function may include querying various resource providers or infrastructure resources to identify what resources are actually running. Another function that the provisioning tool can perform is plan generation, where the provisioning tool can compare the actually running infrastructure components with what the provisioning tool wants the state to look like (e.g., the desired configuration). In other words, the plan generation function can determine what changes need to be made to bring the resources up to the most current expectations. In some instances, a third function is the execution (e.g., apply) function, where the provisioning tool can execute the plan generated by the plan generation function.

In general, provisioning tools may be configured take the configuration file, parse the declarative information included therein, and programmatically/automatically determine the order in which the resources need to be provisioned in order to execute the plan. For example, if the VPC needs to be booted before the security group rules and VMs are booted, then the provisioning tool will be able to make that determination and implement the booting in that order without user intervention and/or without that information necessarily being included in the configuration file.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

As noted above, generally there are two different tools used to handle each of the provisioning of infrastructure resources and the deployments of code to control the infrastructure resources, with orchestration between the two tools being performed manually. However, at scale, manual implementation always leads to deviations. Thus, an automated tool that can both provision and deploy a virtual infrastructure enables more efficient and reliable techniques for implementing a virtual cloud environment.

In some examples, when two tools are used, issues can arise when a user manually makes changes to the code between the provisioning phase and the deployment phase. As described herein, a technique that uses a single tool for both provisioning and deploying can alleviate that by automating the process, such that there isn't an opportunity for manual code changes. It may be the case, that a slight change to the way in which one user codes something, can create major issues in the deployment phase. In some examples, the first time an operator performs an action in a new region (e.g., a typo in the code), the object that was coded with the typo may be that way forever. If the application is deployed with that typo, and the application is not sensitive to that typo (e.g., it still works), it is possible that some time down the road, an additional code change could become sensitive to that typo, and crash the entire system. Thus, the techniques provided herein can remove the gap between provisioning and deployment that can often lead to problems.

In general, modeling deployments is declarative such that a configuration file can be used to declare the infrastructure resources. For example, create, read, update, delete (CRUD) instructions are generally used to generate deployment files using general Representational State Transfer (REST) concepts (e.g., REST Application Programming Interfaces (APIs)). However, deployment itself doesn't generally follow the same concept. Additionally, while the infrastructure provisioning tools tend to be really powerful and/or expressive, the tools for deployment tend to be much more restrictive regarding the operations they can perform (e.g., they are imperative as opposed to declarative). Thus, there has been a long-felt need for a tool that can handle both functional requirements (e.g., provisioning and deployment of infrastructure elements) within a cloud environment.

In some examples, techniques for implementing a cloud infrastructure orchestration service (CIOS) are described herein. Such techniques, as described briefly above, can be configured to manage both provisioning and deploying of infrastructure assets within a cloud environment. In some instances, the CIOS can include two classes of service: the Central and Regional components (e.g., CIOS Central and CIOS Regional). The following terms will be used throughout:

Infrastructure component—A long-lived piece of infrastructure that supports running code.
   Examples: a deployment application, a load balancer, a domain name system (DNS) entry, an object storage bucket, etc.
Artifact—Code being deployed to a deployment application or a Kubernetes engine cluster, or configuration information (hereinafter, "config") being applied to an infrastructure component. These may be read-only resources.
Deployment task—A short-lived task that is often associated with deploying or testing code. Additionally, the deployments tasks are modeled as resources that live no longer than the release that creates them.
   Examples: "deploy $artifact to $environment," "watch $alarm for 10 minutes," "execute $testSuite," or "wait for $manualApproval"
   For example, CIOS can model a deployment orchestrator deployment as the creation of a resource that transitions to the Available state when it completes. Because CIOS maintains the state of its associated declarative provisioner, CIOS can control the lifecycle of these short-lived resources as it relates to releases.
Resource—a CRUD'able resource.
   CIOS models each of the constructs listed above as a resource. The next section discusses this modeling in detail.
Flock—CIOS's sole control-plane resource. Exists primarily to model ownership of and point at the infrastructure components.
Flock config—Describes the set of all infrastructure components, artifacts, and deployment tasks associated with a single service.
   Each Flock has exactly one Flock config. Flock configs are checked in to source control.
   Flock configs are declarative. They expect CIOS to provide realm, region, ad, and artifact versions as input.
   Flocks are granular—a Flock consists of a single service and supporting infrastructure.
State—A point-in-time snapshot of the state of every resource in the flock.

Release—A tuple of a specific version of a flock config and a specific version of every artifact that it references. Think of a release as describing a state that may not yet exist.

Release plan—The set of steps that the CIOS would take to transition all regions from their current state to the state described by a release.

Release plans have a finite number of steps and a well-defined start and end time.

Apply—This is a noun. A single attempt to execute a Release plan. An Execution changes the current State of the Flock.

CIOS can be described as an orchestration layer that applies configuration to downstream systems (e.g., world-wide). It is designed to allow world-wide infrastructure provisioning and code deployment with no manual effort from service teams (e.g., beyond an initial approval in some instances). The high level responsibilities of CIOS include, but are not limited to:

Providing teams with a view into the current state of resources managed by CIOS, including any in-flight change activity.

Helping teams plan and release new changes.

Coordinating activity across various downstream systems within a region to execute approved release plans with no human intervention.

Coordinating activity across regions/realms to execute approved release plans world-wide.

In some examples, CIOS handles onboarding by enabling teams to provide CIOS with configuration information via checked-in code. Additionally, CIOS can automate more things, so this is a heavier-weight exercise than in previous implementations. In some instances, CIOS handles pre-deployment by offering teams the ability to automatically deploy and test code. In some instances, CIOS can handle the writing of change management (CM) policy by enabling automatically generating plans to roll out new artifacts (e.g., world-wide) when a team builds them. It can do this by inspecting the current state of each region and the current CIOS config (which, can itself be an artifact). Additionally, teams can inspect these plans, and may iterate on them by changing the CIOS config and asking CIOS to re-plan. Once the team is satisfied with a plan, they can create a "release" that references the plan. The plan can then be marked as approved or rejected. While teams can still write CMs, they are just pointers to the CIOS plan. Thus, teams can spend less time reasoning about the plan. Plans are more accurate because they are machine generated. Plans are almost too detailed for human consumption; however, it can be displayed via a sophisticated user interface (UI).

In some examples, CIOS can handle execution of CMs by automatically executing the deployment plan. Once release plan has been created and approved, engineers no longer participate in CMs unless CIOS initiates roll-back. In some cases, this may require teams to automate tasks that are currently manual. In some examples, CIOS can handle rolling back a change management (CM) by automatically generating a plan that returns the flock to its original (e.g., pre-release) state when CIOS detects service health degradation while executing. In some examples, CIOS can handle deploying emergent/tactical changes by receiving a release plan that is scoped to a subset of regions and/or a subset of the resources managed by CIOS, and then executing the plan.

Additionally, CIOS may support primitives necessary to define fully automated world-wide deployments. For example, CIOS can measure service health by monitoring alarms and executing integration tests. CIOS can help teams quickly define roll-back behavior in the event of service degradation, then can execute it automatically. CIOS can automatically generate and display release plans and can track approval. In some instances, the language that teams use to describe desired deployment behavior may be declarative. CIOS can combine the functionality of code deployment and infrastructure config (e.g., provisioning) in one system. CIOS also supports flexible ordering across regions, and across components within a region. Teams can express ordering via checked-in config. Teams may call CIOS's planning and release APIs programmatically.

FIG. 1 depicts an architecture 100 for illustrating techniques for implementing at least CIOS Central 102. In some examples, CIOS Central 102 can be the service that handles operations at the level of a "Flock." CIOS Central 102 has a few responsibilities, including but not limited to:

Serving as an authentication gateway for Flock metadata changes and release operations.

Storing an authoritative mapping of Flock metadata to the deployment artifacts and CIOS repositories for the flock.

Coordinating global Releases across Phases and Targets.

Synchronization to enforce policies like "no more than one ongoing release to a Flock at a time."

Detecting changes to Flock configuration (config) and artifacts, and triggering a release generation on such changes.

In some examples, a source code version-control management service (SCVMS) 104 can be configured to store authoritative Flock configuration and an artifact notification service (ANS) 106 can be subscribed to by CIOS Central 102, so that CIOS Central 102 can be informed of new artifact builds. The CIOS Central 102 can then map incoming changes against the affected flocks, and initiate release planning where desired. Additionally, in some examples, an artifact push service (APS) can be invoked by CIOS Central 102, before a release to a target, to ensure any artifacts required for a successful release are present in the target's region ahead of release.

In some examples, customers (e.g., engineers) 108 can call CIOS Central 102 to CRUD flocks and/or releases, and to view the status of ongoing CIOS activity. Flock management service 110 can include one or more API's to manipulate flocks, view/plan/approve service 112 can include CRUD API's to create and approve plans, and to view a central copy of the state of all CIOS-managed resources, change monitoring service 114 can watch SCVMS 104 for changes to flock config, and can receive notifications about changes to other artifacts from ANS 106, and state ingester service 116 can create copies of regional state in CIOS Central database (DB) 118 so that view/plan/approve 112 can expose them. In some examples, the CIOS Central DB 118 can be a DB of flocks, plans, and state. Flock information can be authoritative; while everything else may be a stale copy of data from CIOS Regional 120.

In some examples, engineer 108 can perform an API call for the flock management service 110 (e.g., through the ingress proxy fleet 122) to create a list of flocks. The protocol for making such an API call can be hypertext transport protocol secure (HTTPS) or the like. Relevant access control lists (ACLs) for this operation can include a local area network (LAN) 124 or other private connection. For example, CIOS may manage/control a network-connectivity alternative to using the public Internet for connecting a customer's on-premises data center or network with CIOS (e.g., a dedicated, leased, and/or private connection). Additionally, authentication and authorization (e.g., of the engineer 108) may be performed by a reservation system portal that allows users to manage machine infrastructure (e.g., reservation service). In some instances, CIOS Central 102 can store flock metadata, plans, and state in the Central DB 118, using Java database connectivity (JDBC) or the like. In some examples, ANS 106 can be configured to notify the change monitoring service 114 when new artifacts have been published. The ANS 106 may use HTTPS, and both authentication and authorization may be handled by a mutual transport layer security service. Additionally, in some instances, the change monitoring service 114 can poll the SCVMS 104 for flock configuration changes. This polling can be performed using secure shell (SSH) or other protocols. Authentication of the change monitoring service 114 may be handled by a CIOS system account and authorization may be handled by SCVMS 104.

In some examples, the engineer 108 can use the view/plan/approve service 112 to do one or more of the following operations. The engineer 108 can plan and/or approve by calling CIOS Central 102 to generate and approve plans. The engineer 108 can view by calling CIOS Central 102 to view the status of ongoing CIOS activity world-wide. Additionally, the engineer 108 can CIOS Central 102 to view a replica of the state of CIOS-managed resources world-wide. These API calls (or the like) can be performed via the HTTPS protocol or similar protocols. Additionally, relevant ACLs can be controlled by LAN 124, and both authentication and authorization can be handled by the reservation service. In some examples, the view/plan/approve service 112 can request planning and push plan approval to all regions of CIOS Regional 120 (e.g., using HTTPS or the like). Relevant ACLs can be controlled using a security list managed by the wide area network (WAN) gateway 126. Authentication can be handled by mutual transport layer security and authorization can be handled by various identity policies. Further, the state ingester service 116 can watch CIOS Regional 120 for job status or state changes, so that CIOS can provide a central view of them upon request (e.g., also using HTTPS or the like). ACLSs for this can also be handled by the WAN gateway 126, and both authentication and authorization can be handled by mutual transport layer security services.

Figure 2:
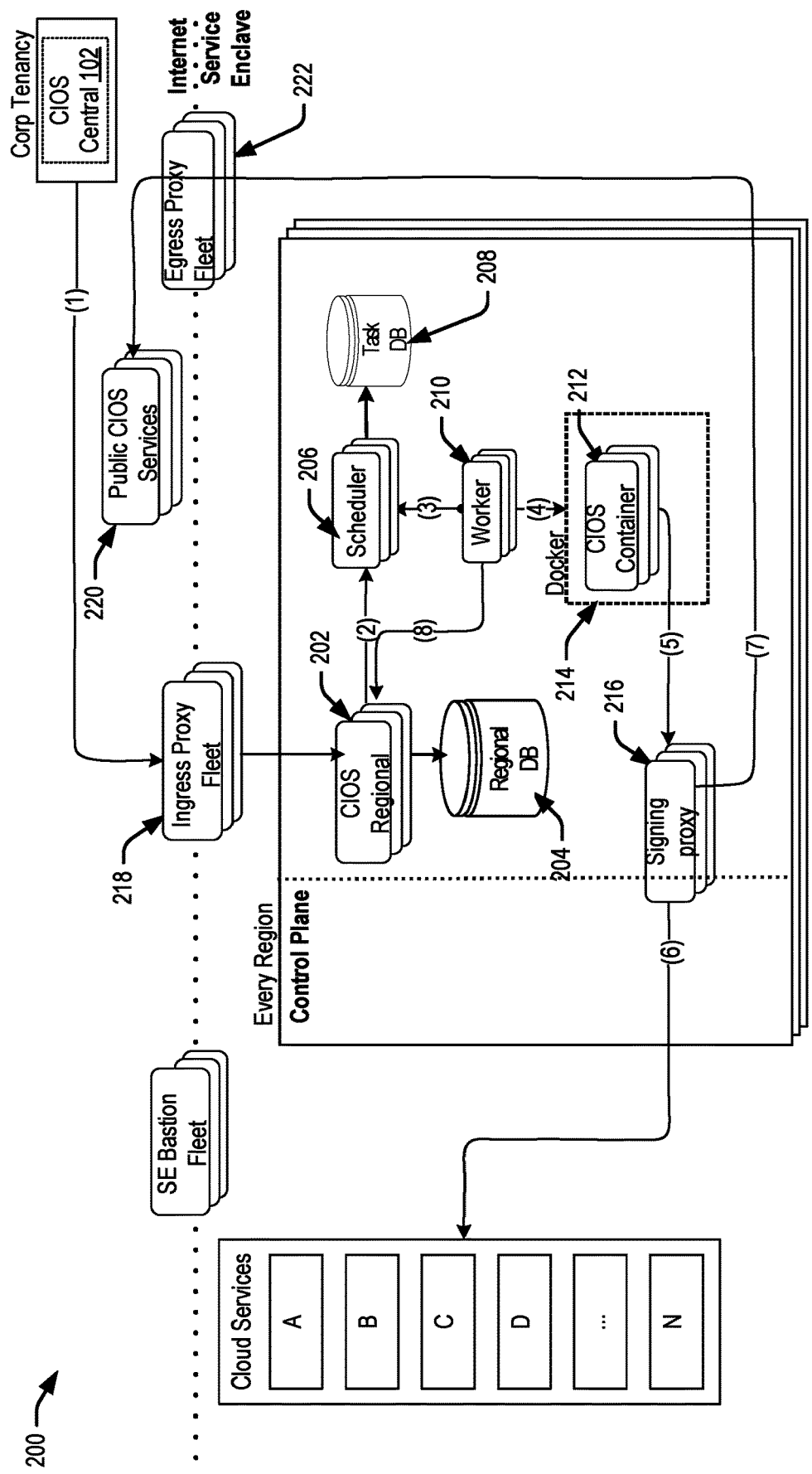
FIG. 2 is a block diagram of an architecture for implementing at least some elements of a cloud infrastructure orchestration service, according to at least one embodiment.

FIG. 2 depicts an architecture 200 for illustrating techniques for implementing at least CIOS Regional 202. In some examples, CIOS Regional 202 is where much of the work of declarative provisioning and planning, as well as approved release application can occur. In some instances, each instance of CIOS Regional 202 may have a regional fronted that can handle operations at the level of "Execution Targets." It can be configured to perform the following:

Handling all CIOS Authentication for incoming operations from CIOS Central 102.
Enforcing a rule that only one "execution" (plan/import resources/apply plan) can be ongoing for a given Execution target at a time.
Managing binary artifact storage for declarative provisioning artifacts used for input and output during declarative infrastructure provisioning execution. Examples of input are declarative infrastructure provisioning configuration files and an input state file. Typical output is a final state file.
Requesting work from and polls for results from the CIOS Executor for any given execution.

In some instances, the CIOS Frontend may be dependent on a CIOS Executor, which can handle the actual execution. The CIOS Executor, in some examples, operates at the level of "Execution," and it can:

Track a pool of available Worker nodes.
Query incoming job requests, and assigns them to eligible workers as available.
Track worker status and Execution updates for reporting to clients Detect dead nodes via a leasing protocol, and can fail tasks assigned to dead nodes, depending on task status.
Provide facilities to cancel/kill/pause/resume Executions, and can map those onto facilities to pass cancellation/kill/resumption info on to Worker nodes.

In some instances, the CIOS Executor can depend on CIOS Workers, which can assign tasks for execution to Workers, and provide a facility for Workers to update job progress. The worker service operates at the granularity of "Task." Each worker is an agent executing Tasks assigned to that worker and reporting Task status and output. Each worker can:

Poll Executor Worker APIs for assigned work items, and take action to make the assign state match its local state:
start containers for polls task items that do not exist locally.
kill containers for locally running containers that have no corresponding assigned task item.
Report status for jobs
Stage input and output for job container execution
Launch and monitor declarative infrastructure provisioning containers for doing the real work of a Release for an Execution Target.

CIOS Workers may depend on CIOS Executor to poll work from and report results to the worker endpoint of the CIOS Executor. The Worker may rely on the Executor for all coordination. Additionally, the CIOS Workers may also depend on CIOS Regional 202, where the Worker services reads input from and writes output to one or more APIs that are associated with the Regional Frontend service. Examples of input are configuration and starting state files and import mappings. Examples of output are declarative provisioning process, output declarative provisioning state files, and import result states.

In some examples, CIOS Regional 202 can be a regional service for managing regional instances/deployments of CIOS. CIOS Regional 202 covers responsibility for authoritatively storing and managing plans and stat that pertains to a particular region. A Regional DB 204 may be a CIOS DB for the state and plans in the particular region. This is the authoritative copy of the region's subset of the Central DB 118 of FIG. 1. Scheduler 206 can be responsible for managing worker fleet capacity, assigning tasks to workers, and keeping track of task state. In some instances, Task DB 208 is another CIOS DB for task state. Data in this DB is mostly for operational purposes. Additionally, Worker 210 can be a fleet of java virtual machines (JVMs) that manage declarative provisioning images. These receive instructions from the Scheduler 206 and communicate results to both the Scheduler 206 and CIOS Regional 202. A CIOS container 212 can run declarative provisioning actions in its own private docker 214 container. This container does not need to contain secrets. Additionally, in some examples, a signing proxy 216 can be configured to prevent secret exfiltration via a declarative provisioning tool, in order to avoid putting secrets in the declarative provisioning Image. Instead, CIOS can perform request signing or initiate a mutual transport layer security (mTLS) service in a proxy. This also makes it easier to use FIPS-compliant crypto libraries.

In some examples, CIOS Central 102 can call CIOS Regional 202 to create plans, push approvals, watch job status (service principal), and extract declarative provisioner state (service principal). An ingress proxy 218 can be configured as the ACL and various identity policies may be used for both authentication and authorization. In some instances, CIOS Regional 202 may run a declarative provisional by asking the scheduler 206 to do so. Worker 210 can ask Scheduler 206 what it should be running, and can report status to Scheduler 206 when done. In some cases, mTLS may handle both authentication and authorization for CIOS Regional 202 and Worker 210. Additionally, when Worker 210 needs to run a declarative provisioner, it does so in docker containers by interacting with the local docker 214. Authentication for this stage may be handled by a local unix socket. A docker protocol may be used for this last step; however, HTTPS may be utilized for the previous ones.

In some examples, the CIOS container 212 enables a declarative provisioner to interact (via API) with the signing proxy 216, while the declarative provisioner thinks it's calling various CIOS services. The signing proxy 216 listens on one ephemeral port per calling instance of declarative provisioner, known only to that declarative provisioner. The signing proxy 216 can initiate requests signatures or mTLS, and can pass the declarative provisioner's calls through to other CIOS services within the service enclave. In some instances, the signing proxy 216 can also communicate with one or more public CIOS services 220. For example, the Signing Proxy 216 will use the internal endpoint of public services where possible. For services with no internal endpoint, it must use the egress proxy 222 to reach the external endpoint. This use of the signing proxy 216 may not be for cross-region communication; for example, an egress proxy whitelist in each region may only be for that region's public IP ranges. In some examples, Worker 210 may then persist state and logs from a declarative provisioner in CIOS Regional 202 so that they can be exfiltrated to CIOS Central 102.

Using CIOS, there are a few phases of a representative customer experience: onboarding, pre-release, world-wide release, and tactical release. For the pre-release phase, the below is an example of what happens between a new artifact being built and releasing artifacts to release one (e.g., R1). This should replace some or most of current change management processes. As relevant artifacts are built, CIOS can automatically generate releases using "the latest version of everything in the flock." A release is a specific version of the flock config with specific inputs (e.g., artifact versions, realm, region, and ad). A release contains one roll-forward plan per region and metadata describing region ordering. Each regional plan is the set of operations a declarative provisioner would take to realize the flock configuration in that region. Teams with pre-release environments can use CIOS to automatically release and test software in said environments. Teams can configure CIOS to automatically test the roll-back plan. Teams will be able to inspect and approve releases through the CIOS UI. Teams can approve some but not all of the regional plans within a release. If "the latest version of everything" yielded no suitable plans, teams can ask CIOS to generate a plan for cherry-picked artifact versions.

For the world-wide release phase, the below is an example of how a team executes tomorrow's version of today's "normal CM." Once a release is approved, CIOS pushes each approved regional plan to the respective region. CIOS acts independently within each region to apply approved plans. CIOS will only perform the set of actions explicitly described in that region's plan. Instead of "thinking independently," it will fail. CIOS UI shows teams the progress of the execution. CIOS UI prompts teams when manual approvals are required. If execution fails because of an outage in CIOS or in a downstream service, CIOS can notify the team and can prompt them for next steps (e.g., abort, retry). CIOS does perform retries, but some downstream system outages will exceed its willingness to retry. If execution fails because of service health degradation or a test failure, CIOS will assist teams with rolling the flock back to its starting state. CIOS will notify (e.g., page) teams when it initiates automatic rollback. Teams must approve the rollback plan, then CIOS will execute it.

For the tactical release phase, the below is an example of how a team can execute tomorrow's version of an "emergent CM." When generating a plan, teams may ask CIOS to target the plan at specific resources in several ways: topologically (e.g., realm, region, AD, etc.), by resource type (e.g., "only metrics configs" or "only deployment orchestration service deployments", etc.), or combinations of the above (e.g., in a disjunctive manner). Teams approve tactical releases just like world-wide releases. CIOS orchestrates them similarly. If a team needs to deploy a tactical release while there is an active a world-wide release, CIOS will stop executing the world-wide release in the targeted regions, then start executing the tactical release.

In some examples, a declarative provisioner's state (e.g., traditionally a file) is an authoritative record of the set of resources managed by the declarative provisioner. It contains the mapping between the logical identifier of each resource from config and the actual identifier of the resource. When the declarative provisioner is creating a resource, certain kinds of failure can prevent the actual identifier from being recorded in the state. When this happens, the actual identifier is lost to the declarative provisioner. These can be called "orphaned resources."

For most resources, orphans represent waste—the declarative provisioner launched (for example) an instance that it forgot about, but will launch another instance instead the next time it is run. For resources with uniqueness constraints or client-supplied identifiers, orphans prevent the declarative provisioner from making forward progress. For example, if the declarative provisioner creates a user 'nglass' and a failure orphans it, the next run of the declarative provisioner will attempt to create 'nglass' and fail because a user with that username already exists. In some cases, orphans are only a problem when adding new resources to the state. In some instances, the declarative provisioner's refresh behavior may naturally recover from failures to record updates and deletions.

CIOS needs to be robust in the event of downstream service outages or outages of CIOS itself. Because CIOS can leverage a declarative provisioner to apply changes, this means there should be robustness around running the declarative provisioner and maintaining the declarative provisioner state. The declarative provisioner providers perform 'small scale' retries—enough to avoid outages lasting for small numbers of minutes. For example, a cloud provider will retry for up to 30 minutes. Downstream system outages lasting longer than 30 minutes will cause the declarative provisioner to fail. When the declarative provisioner fails, it records all changes it successfully made in the state, then exits. To retry, CIOS must re-execute the declarative provisioner. Re-executing the declarative provisioner also allows CIOS to retry in the event of a failure in CIOS itself. In some instances, CIOS can run the following operations in a loop:

Refresh—the declarative provisioner calls GET APIs to retrieve a fresh snapshot of every resource described in its state.

Plan—the declarative provisioner generates a plan (a concrete set of API calls) that will realize the desired state, given the recently-refreshed current state.

Apply—the declarative provisioner executes the set of steps in the plan.

CIOS may always run all three of these steps when executing the declarative provisioner. The refresh operation helps recover from any updates or deletions that weren't recorded. CIOS inspects the result of the plan operation and compares it to the approved release plan. If the newly generated plan contains operations that were not in the approved release plan, CIOS may fail and may notify the service team.

Figure 3:
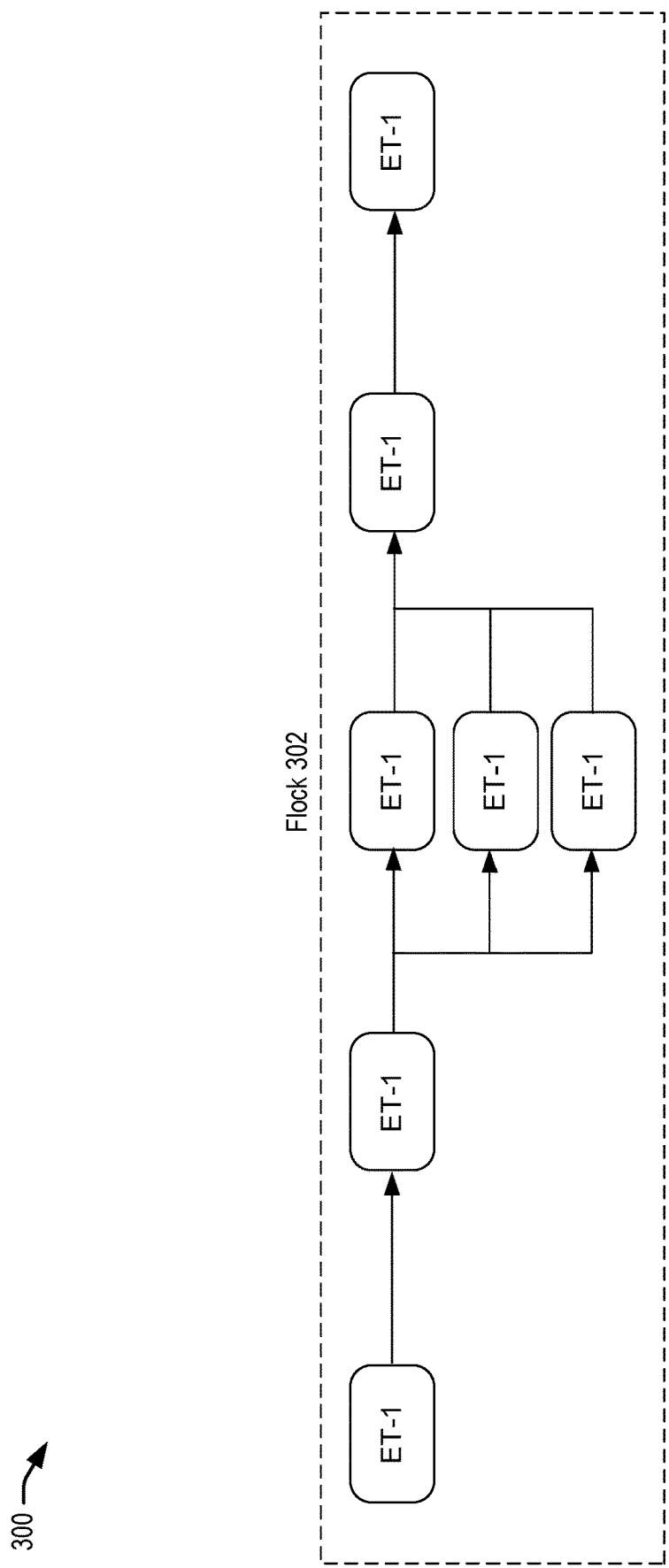
FIG. 3 is a flow diagram for illustrating an example flock, according to at least one embodiment.

FIG. 3 depicts a directed acyclic graph (DAG) 300 for illustrating an example flock 302. The progression of code/config from check-in to production, for a single flock config in CIOS, can be described all the way from the first testing deployment to the last prod deployment. Internally, CIOS calls each element in the progression an Execution Target (ET)—this is all over our internal APIs, but does not leak out into the flock config. CIOS executes ETs based on the DAG 200 defined in the flock config. Each ET (e.g., ET-1, ET-2, ET-3, ET-4, ET-5, ET-6, and ET-7) is, roughly, one copy of the service described by the flock config.

Figure 4:
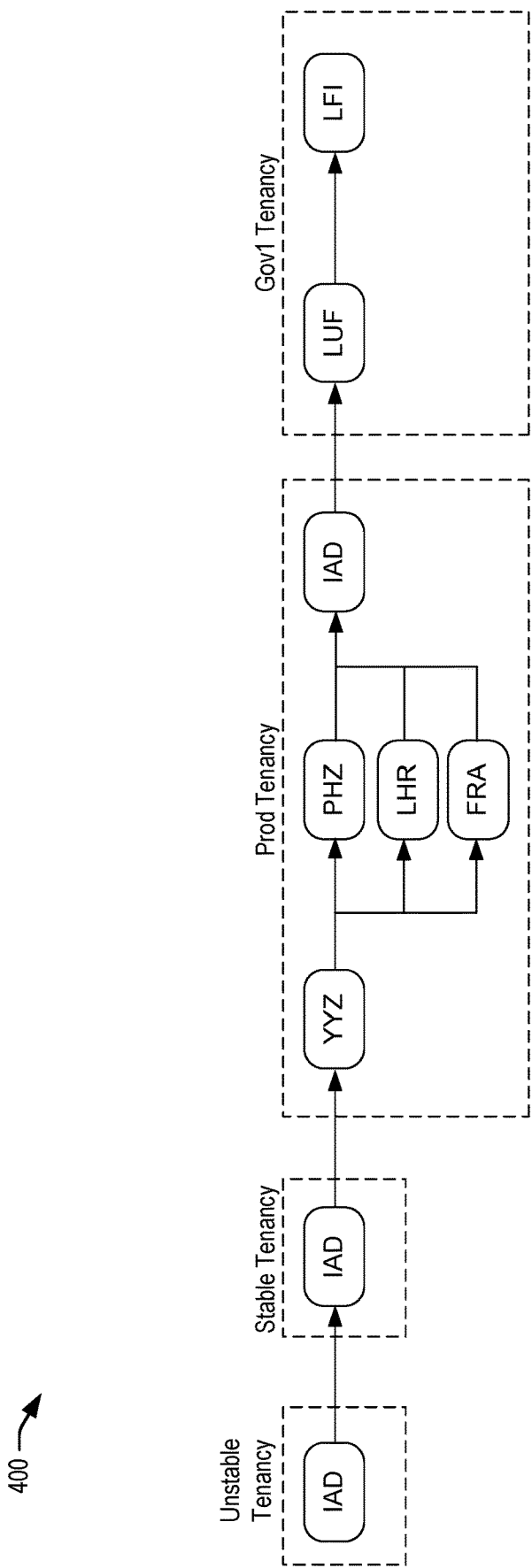
FIG. 4 is a flow diagram for illustrating an example flock, according to at least one embodiment.

FIG. 4 depicts a DAG 400 for illustrating and example flock 402. In the flock config, CIOS is very opinionated about how teams express this progression—they must model it using cloud infrastructure tenancies and regions. Teams should not model progression using realms. CIOS allows teams to use many tenancies within a realm and many regions within a tenancy. However, CIOS does not allow teams to use the same region twice within a tenancy (though they may use the same region twice within a realm—in different tenancies). DAG 400 illustrates a version of DAG 300 from FIG. 3, expressed with tenancies and regions. This example is for an overlay service, where pre-prod ETs are in a prod region. A service enclave service would have the unstable and stable tenancies in release one. In DAG 400, IAD is a regional airport code for Dulles airport in Washington, D.C., YYZ is a regional airport code for Toronto, Ontario, PHX, LHR, and FRA, are regional airport codes for Phoenix, London, and Frankfurt, respectively, and LUF and LFI are for two different air force bases.

In one embodiments, CIOS and/or other techniques described herein are an improvement on each of Terraform (a declarative provisioning tool), Tanden (a code generation tool), and the Oracle Deployment Orchestrator (ODO). Additionally, in some examples, CIOS and/or other techniques described herein can be implemented using at least portions of the Terraform, Tanden, and ODO tools.

In some examples, a safety plan may be generated for safely handling drift. Configuration files can include information that instruct CIOS how to make changes to a region (e.g., a geographic region where a cloud infrastructure is to be (or already has been) set up). CIOS is capable of validating that what a client has reviewed as the change set (e.g., the delta between the current state of the cloud infrastructure and the expected new state after the change) is actually modified in the region. When a client interacts with CIOS to cause a world-wide plan, a safety plan identifies what changes are expected to be made by CIOS based on the world now (e.g., current state) to get to the world that was described in the configuration file (e.g., the target state). As described herein "the world" may refer to the expected state of a cloud infrastructure including all the settings and configurations of the cloud setup. In some instances, drift is the idea that between the time a plan is generated, and when deployment of the region begins, one or more device configurations/settings may have changed (e.g., a virtual machine may have gone down or the like). That change is the drift. CIOS can make the safety plan and ship it around the world to various regions (e.g., transmitting to various different CIOS regionals). Any time CIOS is about to implement a change, the planning task can be repeated. For example, the current state can be expected, and can be compared with the target state, and a diff (e.g., delta, difference, etc.) between the two can be generated. If that diff is a subset of the safety plan, then no drift has occurred, and the safety plan can still be implemented. Otherwise, a problem with the safety plan has been detected, and a change needs to be made prior to deployment. Additionally, in some examples, CIOS can compare different safety plans (e.g., to handle phase changes). For example, for a deployment to phase (e.g., deploying resources to a first phase prior to other phases), the safety plan may be reviewed and approved, and thus the deployment may execute. Then, later, for a deployment of phase 2, a new safety plan can be generated and compared to the first safety plan. If the new safety plan is a subset of the first safety plan, then the new safety plan can be automatically approved without even sending anything to the client that generated the configuration files. Alternatively, if there is something novel in the new safety plan (e.g., something that doesn't exist in the first safety plan), then that novel aspect can be presented to a user (e.g., the client) via a user interface (UI). The user can then approve or reject the novel aspect (e.g., enabling or disallowing the deployment change to occur).

Figure 5:
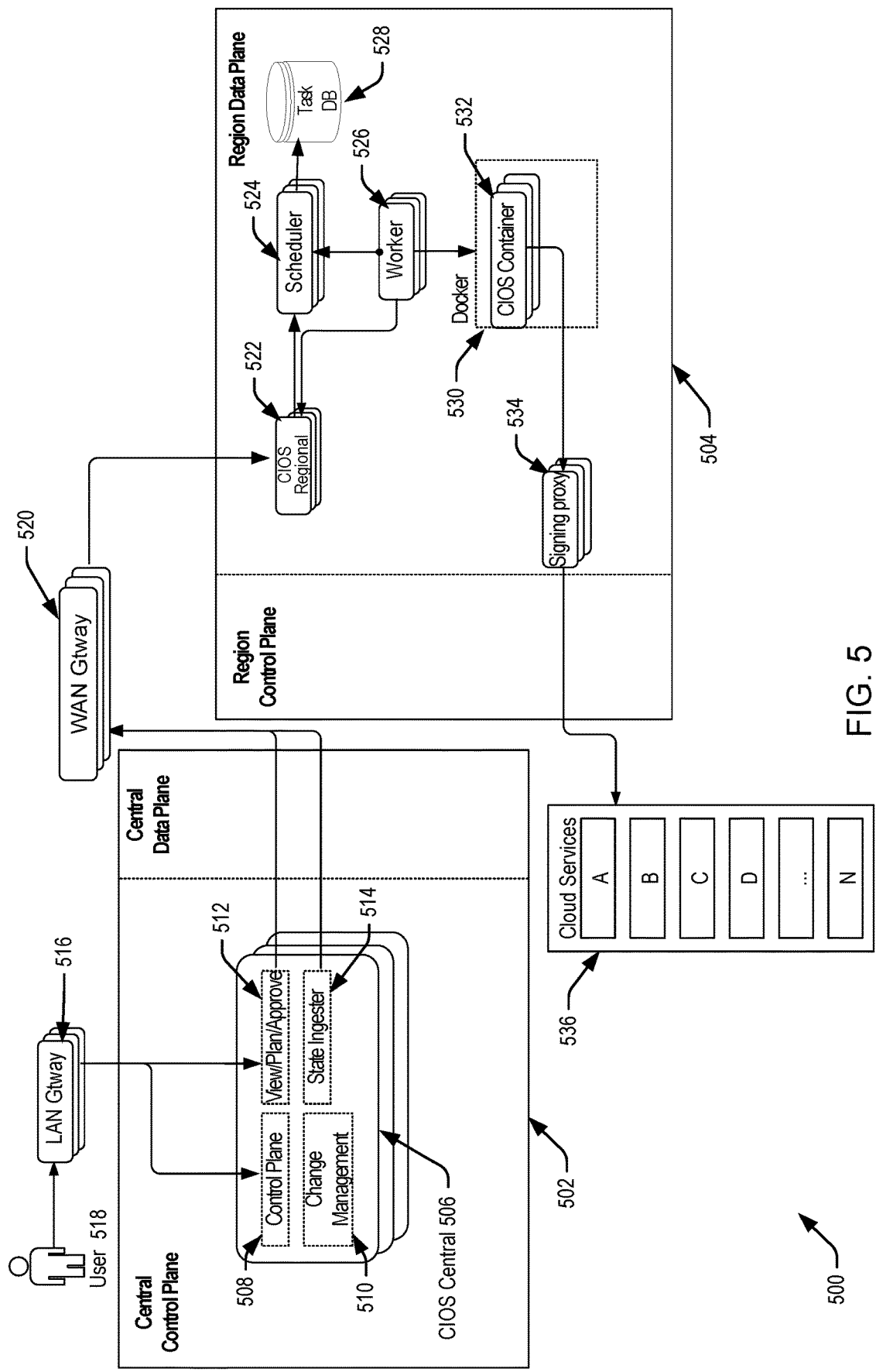
FIG. 5 is a block diagram of a cloud infrastructure orchestration service, according to at least one embodiment.

FIG. 5 is a block diagram 500 of a CIOS that can generate and use a safety plan, according to at least one embodiment. In some examples, the safety plan may be a set of operations that have been approved by a user and that may be executed by CIOS. The block diagram 500 illustrates an example architecture of CIOS that can include a central control plane 502 and a region data plane 504. The central control plane 502 can include CIOS central 506 (e.g., similar to CIOS Central 102 of FIG. 1) that can include a control plane 508, a change management module 510, a view/plan/approve module 512, and a state ingester 514. The control plane 508 and the view/plan/approve module 512 may be communicatively coupled to a local area network (LAN) gateway 516 that a user 518 can use to communicate with CIOS central 506. The view/plan/approve module 512 and the state ingester 514 can be communicatively coupled to a wide area network (WAN) 520 (e.g., the Internet) that can be communicatively coupled to CIOS regional 522 (e.g., similar to CIOS Regional 120 of FIG. 1 or CIOS Regional 202 of FIG. 2) that is contained in the region data plane 504.

CIOS regional 522 can be communicatively coupled to a scheduler node 524 and a worker node 526. The worker 526 can be communicatively coupled to the scheduler 524 that can be communicatively coupled to a task database (DB) 528. The worker 526 can be communicatively coupled to a docker 530 that can include a CIOS container 532. The CIOS container 532 may be communicatively coupled to a signing proxy 534 that can be communicatively coupled to cloud services 536.

CIOS regional 522 may receive tasks from CIOS central 506 and may transmit tasks to the scheduler 524. Tasks may include executing CRUD operations or any other suitable task for deploying infrastructure resources in the region at execution target(s). The scheduler 524 can record the tasks in the task DB 528 and may transmit the tasks to the worker 526 that may be included in a worker fleet. The worker fleet can include many workers 526, and the scheduler 524 may choose the worker 526 with the least amount of work or most amount of available computing resources to which to assign a task. The scheduler 524 may assign one task to the worker 526 at one time. The worker 526 may execute the task, and in executing the task, the worker may make a call to CIOS container 532 that is included in the docker 530. CIOS container 532 may execute tasks that include infrastructure provisioning and/or deployment instructions (e.g., Terraform instructions). The instructions may direct an API call to cloud services 536, which may include services available to the region, that may not be available via a public network (e.g. the Internet). To make the API call to cloud services 536, CIOS container 532 may transmit a request to make the API call to the signing proxy 534 that can determine if the request is valid. In response to determining the request is valid, the signing proxy 534 may make the API call to cloud services 536.

In some examples, the user 518 may create a configuration file that may include operations to execute in the region data plane 504. The user 518 can transmit the configuration file to CIOS central 506, which may be a computing device contained in the central control plane 502, via the LAN gateway 516. The configuration file can be received by CIOS central 506 at the control plane 508 or at the view/plan/approve module 512. The change management module 510 may compile the configuration file into a region-agnostic (RA) configuration file that can be used at the region data plane 504. The view/plan/approve module 512 or the state ingester 514 may transmit the RA configuration file to CIOS regional 522, which may be a computing device contained in the region data plane 504, via the WAN gateway 520.

CIOS regional 522 can receive the RA configuration file from CIOS central 506, and CIOS regional 522 can transmit the RA configuration file to the scheduler 524 that may create a task and transmit the task to the task DB 528. The task may include compiling a set of operations to be executed at an execution target and may include comparing a current state of resources at the execution target to a desired state of resources at the execution target. The task can be transmitted to the worker 526 that may execute the task. In executing the task, the worker 526 may help create a safety plan, which is a set of approved operations. The operations may include deploying resources at the execution target or any other suitable operations to execute at the execution target. The worker 526 may transmit the safety plan to CIOS regional 522 that can transmit the safety plan to CIOS central 506 via the WAN gateway 520.

CIOS central 506 can receive the safety plan from CIOS regional 522 and can compare the set of changes contained in the safety plan to operations at the execution target. The change management module 510 may execute this comparison and may make one of two determinations: that the operations are a subset of the set of changes in the safety plan or that the operations are not a subset of the set of changes in the safety plan. While only these two determinations are described in detail, other determinations may be made (e.g., what percent difference there is between the set of changes and the safety plan, or the like). In response to determining that the operations are a subset of the set of changes contained in the safety plan, the operations may be executed, which may include deploying resources at the execution target. In response to determining that the operations are not a subset of the set of changes contained in the safety plan, a notification can be sent to the user 518. The notification can be transmitted to the user 518 via the LAN gateway 516 and may include information alerting the user 518 that drift may have occurred or that operations that may be scheduled to be executed at the execution target may not be contained in the safety plan. In response to viewing the notification, the user 518 may approve or deny operations not contained in the safety plan. If the user 518 approves the operations, the operations are executed, and resources may be deployed at the execution target. If the user 518 denies the operations, the operations may not be executed, and the user 518 may decide to create a new configuration file or may decide to abandon the operations.

In other examples, the user 518 can create a set of configuration files that can include a desired state of resources for a set of execution targets at a set of regions. The configuration files can be transmitted to CIOS central 506 that can compile the configuration files into a set of RA configuration files that includes one RA configuration file for each region. The RA configuration files can be transmitted to the respective regions via the WAN gateway 520 and can be received by CIOS regional 522 that is contained in the respective region.

In the respective region, CIOS regional 522 can receive the respective RA configuration file from CIOS central 506, and CIOS regional 522 can transmit the respective RA configuration file to the scheduler 524 that may create a task and transmit the task to the task DB 528. The task may include compiling a set of operations to be executed at an execution target in the respective region and may include comparing a current state of resources at the execution target to a desired state of resources at the execution target. The task can be transmitted to the worker 526 that may execute the task. In executing the task, the worker 526 may help create a safety plan, which is a set of approved operations. The operations may include deploying resources at the execution target or any other suitable operations to execute at the execution target. The worker 526 may transmit the safety plan to CIOS regional 522 that can transmit the safety plan to CIOS central 506 via the WAN gateway 520.

CIOS central 506 may receive a set of safety plans from the regions and may compile the safety plans into a master safety plan (e.g., a safety plan of safety plans), also described as the compiled safety plan. Each safety plan contained in the compiled safety plan may include similar changes. Differences in changes between safety plans contained in the compiled safety plan may indicate that drift has occurred in at least one region. CIOS central 506 may compare changes contained in each safety plan contained in the compiled safety plan to operations at the execution targets contained in the respective regions. The change management module 510 may execute this comparison and may make one of two determinations: that the operations are a subset of the set of changes in the compiled safety plan or that the operations are not a subset of the set of changes in the compiled safety plan. In response to determining that the operations are a subset of the set of changes contained in the compiled safety plan, the operations may be executed, which may include deploying resources at the execution targets contained in the respective regions. In response to determining that the operations are not a subset of the set of changes contained in the compiled safety plan, a notification can be sent to the user 518. The notification can be transmitted to the user 518 via the LAN gateway 516 and may include information alerting the user 518 that drift may have occurred in at least one region or that operations that may be scheduled to be executed in at least one execution target may not be contained in the compiled safety plan. In response to viewing the notification, the user 518 may approve or deny operations not contained in the safety plan. If the user 518 approves the operations, the operations are executed, and resources may be deployed at the execution targets contained in the respective regions. If the user 518 denies the operations, the operations may not be executed, and the user 518 may decide to create a new configuration file or may decide to abandon the operations.

Figure 6:
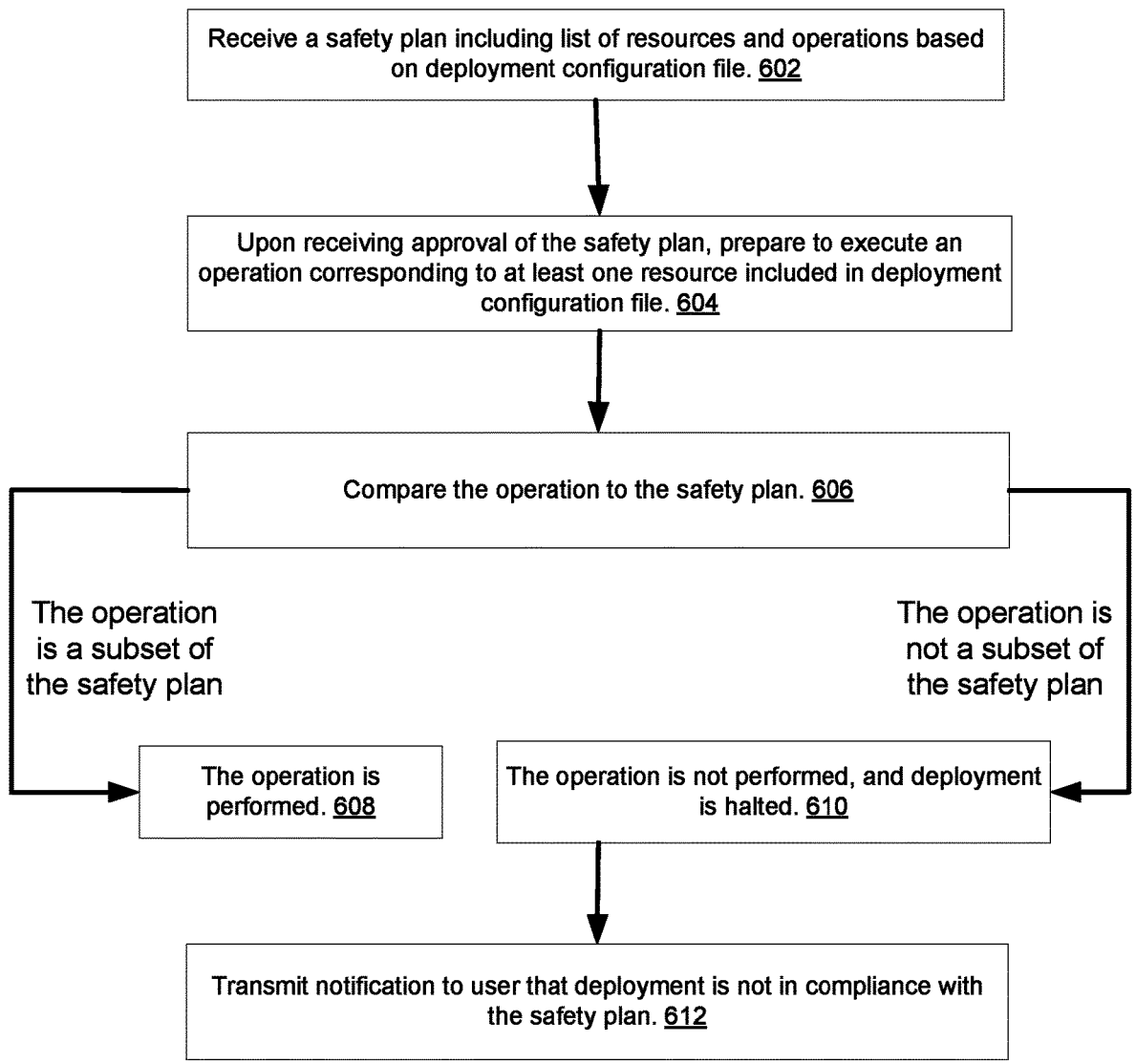
FIG. 6 is a flow chart for describing a process for using a safety plan in a cloud infrastructure orchestration service, according to at least one embodiment.
Figure 7:
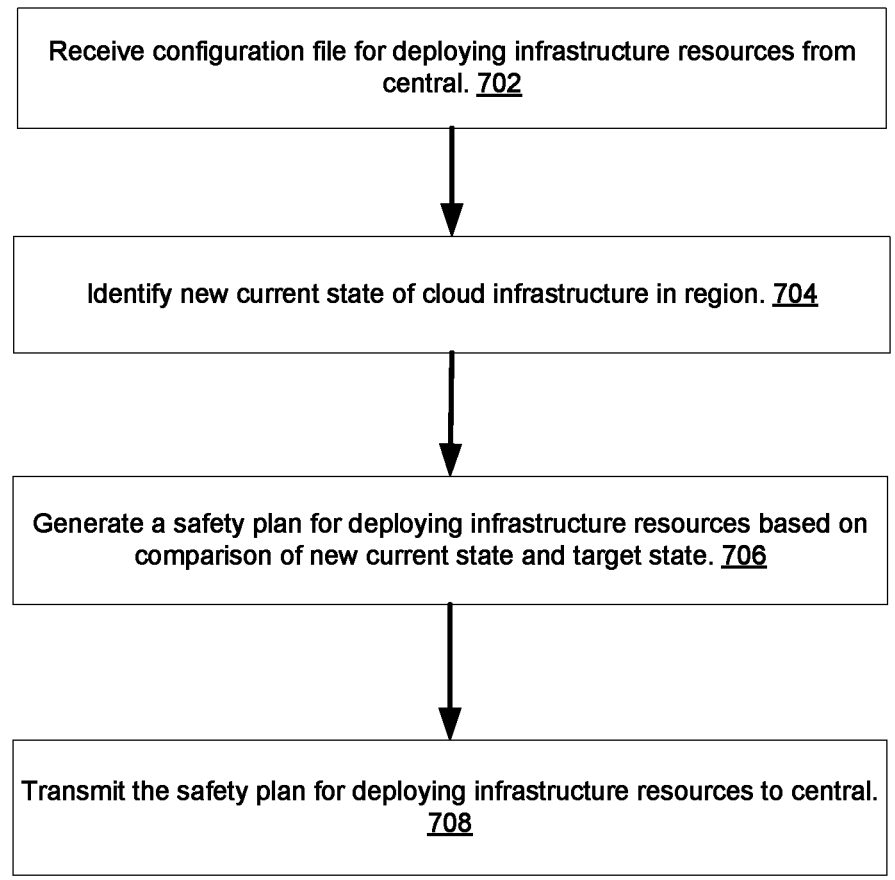
FIG. 7 is a flow chart for describing a process for generating a safety plan in a cloud infrastructure orchestration service, according to at least one embodiment.

FIGS. 6 and 7 illustrate example flow diagrams showing processes 600 and 700 for implementing techniques of CIOS, according to certain embodiments of the present disclosure. These processes are illustrated as logical flow diagrams, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, the processes 600 and 700 may be performed under the control of one or more computing devices or computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. In some embodiments, the processes 600 and 700 may be performed by a plurality of processors in parallel. The computer-readable storage medium may be non-transitory.

FIG. 6 is a flow chart for describing a process 600 for using a safety plan in a cloud infrastructure orchestration service, according to at least one embodiment. The process 600 may begin at block 602, where CIOS central (e.g., CIOS central 506 of FIG. 5) receives a safety plan from CIOS regional (e.g., CIOS regional 522 of FIG. 5) of a region containing an execution target. The safety plan may include a list of resources and operations based on a deployment configuration file. The operations may include instructions to deploy the resources at the execution target. In some examples, CIOS central may receive a set of safety plans, from a set of CIOS regionals, corresponding to a set of regions. The safety plans may be compiled by CIOS central into a compiled safety plan that may include resources and operations based on deployment configuration files corresponding to execution targets, each of the execution targets contained in different regions.

At block 604, CIOS central prepares to execute at least one operation corresponding to at least one resource contained in the deployment configuration file. In response to receiving the safety plan from CIOS regional, CIOS central may prepare to execute at least one operation in at least one execution target, for example by compiling a local plan that may include the at least one operation. The operation may involve deploying at least one resource at the execution target. In some examples, CIOS central may prepare to execute a set of operations corresponding to a set of resources contained in a set of deployment configuration files. In this example, CIOS central may receive a set of safety plans, from a set of CIOS regionals, corresponding to a set of regions.

At block 606, CIOS central compares the operation to the safety plan. A change management module (e.g., the change management module 510 of FIG. 5) that can be contained in CIOS central may execute the comparison. The comparison may involve determining if the operation is a subset of the safety plan. The operation may be considered a subset of the safety plan if the safety plan includes the operation. In some examples, the operation may not change the current state of the execution target. In this case, CIOS central may not execute the operation, but the operation may be considered a subset of the safety plan.

At block 608, the operation is executed. In response to the change management module determining that the operation is a subset of the safety plan, CIOS central may transmit a command to execute the operation. The command may be transmitted by CIOS central to CIOS regional in the respective region and may involve deploying resources, that are contained in the deployment configuration file, at the execution target. In an example in which resources are desired to be deployed at more than one execution target, more than one safety plan may be received by CIOS central. In this case, CIOS central may prepare to execute the operations, and the change management module may compare the operations to the safety plans to determine if the operations are a subset of the safety plans. In response to the change management module determining that the operations are a subset of the safety plans, CIOS central may transmit a command to each region to execute the operations. The command may be transmitted by CIOS central to CIOS regional in each region and may involve deploying resources, that are contained in the deployment configuration file, at each execution target.

At block 610, the operation is not performed, and the deployment is halted. In response to the change management module determining that the operation is not a subset of the safety plan, CIOS central may not transmit a command to execute the operation, and instead, CIOS central may halt the deployment. In the case in which resources are desired to be deployed at more than one execution target, more than one safety plan may be received by CIOS central. In this case, CIOS central may prepare to execute the operations, and the change management module may compare the operations to the safety plans to determine if the operations are a subset of the safety plans. In response to the change management module determining that the operations are not a subset of the safety plans, CIOS central may not transmit a command to execute the operations. Instead, CIOS central may halt the deployment. In other examples, CIOS central may halt operations that are not a subset of the safety plans and may transmit a command to execute operations that are a subset of the safety plans.

At block 612, CIOS central transmits a notification to the user (e.g., the user 518 of FIG. 5) that the deployment is not in compliance with the safety plan. In response to determining that the operation is not a subset of the safety plan (as done at block 610), CIOS central may create and transmit a notification to the user that the deployment is no longer in compliance with the safety plan. The notification may present the user with an option to choose to continue with the deployment even though the operation is not a subset of the safety plan. The user may choose to continue the deployment or may choose to abandon the deployment. If the user chooses to abandon the deployment, the user may create another configuration file to attempt a different deployment. In the case in which resources are desired to be deployed at more than one execution target, the notification transmitted to the user may include deployments that are not in compliance with the safety plans. CIOS central may transmit a command to execute the operations that have been determined to be a subset of the operations.

FIG. 7 is a flow chart for describing a process 700 for generating a safety plan in a cloud infrastructure orchestration service, according to at least one embodiment. At block 702, CIOS regional (e.g., CIOS regional 522 of FIG. 5), included in a region, receives a configuration file from CIOS central (e.g., CIOS central 506 of FIG. 5) for deploying infrastructure resources. The configuration file may include operations that include instructions to deploy resources at an execution target included in the region.

At block 704, CIOS regional identifies a new current state of cloud infrastructure in the region. The configuration file may define a desired state of cloud infrastructure in the region, and in response to receiving the configuration file, CIOS regional may identify the current state of resources in the region. In some example, the current state may be similar to or identical to the desired state. In other examples, the current state may not include any resources, and the desired state may include most resources desired to be deployed at the execution target.

At block 706, CIOS regional generates a safety plan for deploying infrastructure resources based on a comparison between the current state and the desired state. The safety plan may include operations that may be executed at the execution target. The operations may involve deploying infrastructure resources at the execution target. In some examples in which the current state and the desired state are similar or identical, the safety plan that is compiled by CIOS regional may be empty or may not include any operations.

At block 708, CIOS regional transmits the safety plan for deploying infrastructure resources to CIOS central. In response to creating the safety plan, CIOS regional may transmit the safety plan to CIOS central to execute a comparison. CIOS central may determine, as in block 608 of process 600, that the operation to be executed at the execution target is a subset of the safety plan. In response to this determination, CIOS regional may execute the operation and may deploy resources, included in the configuration file, at the execution target.

Figure 8:
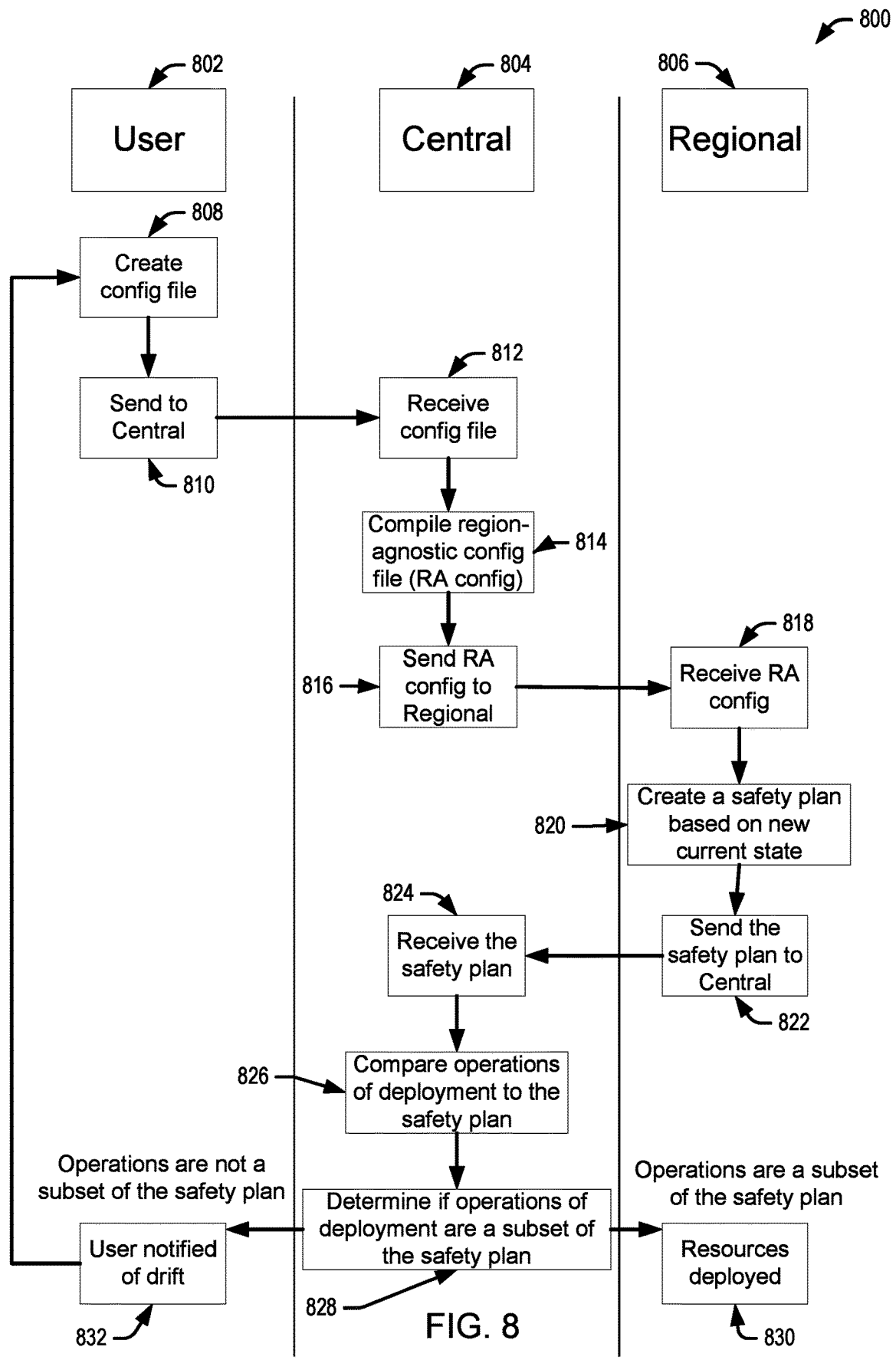
FIG. 8 is a swim lane diagram for describing how a safety plan is generated and used, according to at least one embodiment.

FIG. 8 illustrates an example swim lane diagram showing a process 800 for implementing techniques of CIOS, according to certain embodiments of the present disclosure. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, the process 800 may be performed under the control of one or more computing devices or computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. In some embodiments, the process 800 may be performed by a plurality of processors in parallel. The computer-readable storage medium may be non-transitory.

FIG. 8 is a swim lane diagram for describing a process 800 for describing how a safety plan is generated and used, according to at least one embodiment. The diagram, as shown, includes three lanes: a user lane 802, a central lane 804, and a regional lane 806. The user lane 802 can include operations performed by, or commands given to a computing system by, a user (e.g., the user 518 of FIG. 5). The central lane 804 can include operations performed by CIOS central (e.g., CIOS central 506 of FIG. 5). The regional lane 806 can include operations performed by CIOS regional (e.g., CIOS regional 522 of FIG. 5).

The process 800 may begin at block 808 in which the user creates a configuration file. The user may desire to deploy infrastructure resources at an execution target included in a region. In response to this desire, the user can create a configuration file that can define a desired state of the execution target. At block 810, the user sends the configuration to CIOS central. In response to creating the configuration file, the user may transmit the configuration file to CIOS central to initiate a deployment.

At block 812, CIOS central receives the configuration file from the user. In response to receiving the configuration file from the user, CIOS central may initiate the deployment. At block 814, CIOS central compiles a region-agnostic (RA) configuration file. In response to initiating the deployment, CIOS central may compile the RA configuration, which may be a configuration file that may not depend on the region in which the RA configuration file is sent. At block 816, CIOS central transmits the RA configuration file to CIOS regional. In response to creating the RA configuration file, CIOS central may transmit the RA configuration file to CIOS regional the region in which resources are desired to be deployed.

At block 818, CIOS regional in the region in which resources are desired to be deployed receives the RA configuration file. The RA configuration file may include operations to execute for deploying infrastructure resources at the execution target. CIOS regional may transmit the RA configuration file to a worker node (e.g., the worker 526 of FIG. 5) that may execute a comparison. At block 820, CIOS regional creates a safety plan based on a new current state. The worker can compare a new current state of infrastructure resources in the region with the desired state of infrastructure resources as defined in the RA configuration file. CIOS regional can create the safety plan based at least in part on the comparison executed by the worker. The safety plan may include approved changes to resources at the execution target.

At block 822, CIOS regional transmits the safety plan to CIOS central. In response to creating the safety plan, CIOS regional can transmit the safety plan to CIOS central for determining if operations can be deployed at the execution target. At block 824, CIOS central receives the safety plan from CIOS regional. In some examples in which resources are desired to be deployed in more than one region, CIOS central may receive more than one safety plan. In this case, CIOS central may compile a safety plan of safety plans, herein after referred to as the compiled safety plan. At block 826, CIOS central compares operations of the deployment to the safety plan. Operations of the deployment may include instructions to deploy infrastructure resources at the execution target. In the case of the compiled safety plan, CIOS central may compare operations to the compiled safety plan. At block 828, CIOS central determines if the operations are a subset of the safety plan. In the case of the compiled safety plan, CIOS central may determine if the operations are a subset of the compiled safety plan.

At block 830, in response to CIOS central determining that the operations are a subset of the safety plan, CIOS central transmits a command to CIOS regional to execute the operations. In this case, infrastructure resources may be deployed at the execution targets, and in the case of the compiled safety plan, resources may be deployed at more than one execution target. In other examples, the operations may not change the state of the execution target, and in this case, CIOS central may take no action. At block 832, in response to CIOS central determining that the operations are not a subset of the safety plan, CIOS central halts the deployment. In this case, CIOS central transmits a notification to the user that may inform the user that drift has occurred and that the operations are not in compliance with the safety plan. The notification may allow the user to allow the operations to be executed. If the user chooses to not allow the operations to be executed, the user may abandon the deployment or may create a new configuration file and transmit the new configuration file to CIOS central to initiate a second deployment. In the case of the compiled safety plan, CIOS central may transmit a notification to the user if the operations are not a subset of the compiled safety plan.

Figure 9:
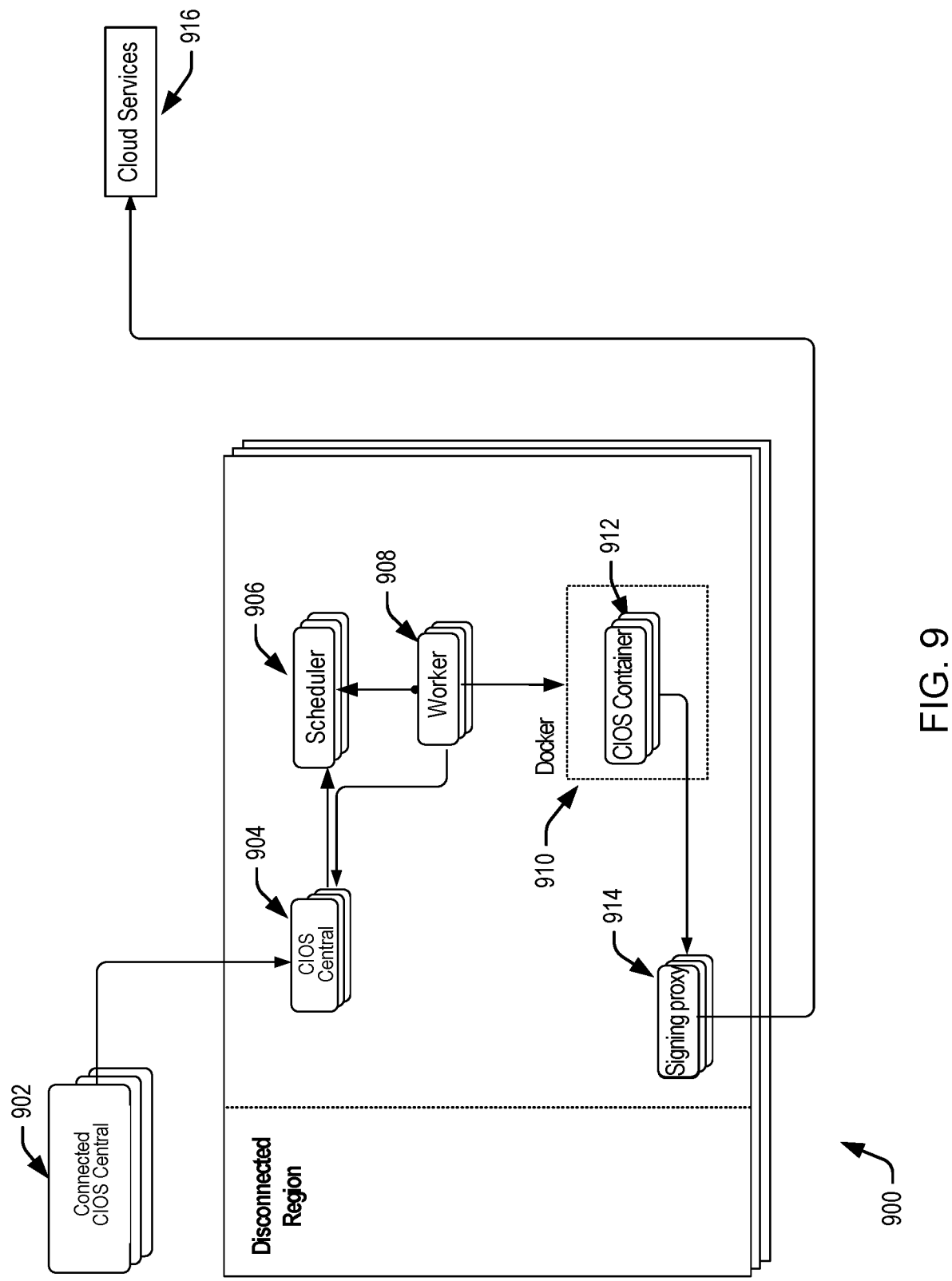
FIG. 9 is a block diagram of a disconnected region, according to at least one embodiment.

FIG. 9 is a block diagram of a disconnected region 900, according to at least one embodiment. The disconnected region 900 may be communicatively coupled to a connected CIOS central 902 (e.g., CIOS central 506 of FIG. 5). But the connection between the disconnected region 900 and the connected CIOS central 902 may not be in real-time and may be delayed. The disconnected region 900 can include a CIOS central 904 (e.g. CIOS central 506 of FIG. 5), a scheduler node 906 (e.g. the scheduler 524 of FIG. 5), a worker node 908 (e.g. the worker 526 of FIG. 5), a docker 910 (e.g. the docker 530 of FIG. 5) that can include a CIOS container 912 (e.g. the CIOS container 532 of FIG. 5), and a signing proxy 914 (e.g. the signing proxy 534 of FIG. 5). In some examples, the disconnected region 900 may be able to receive information/instructions from the connected CIOS central 902; however, the connected CIOS central 902 may be disconnected with respect to communications from the disconnected region 900. In other words, the communication may be one-way, and once the connected CIOS central 902 sends information in, it will be unable to confirm what operations the disconnected region 900 performs.

CIOS central 904 may receive tasks from the connected CIOS central 902 and may transmit tasks to the scheduler 906. Tasks may include executing CRUD operations or any other suitable task for deploying infrastructure resources in the region at execution target(s). The scheduler 906 can transmit the tasks to the worker 908 that may be included in a worker fleet. The worker fleet can include many workers 908, and the scheduler 906 may choose the worker 908 with the least amount of work or most amount of available computing resources to which to assign a task. The scheduler 906 may assign one task to the worker 908 at one time. The worker 908 may execute the task, and in executing the task, the worker may make a call to CIOS container 912 that is included in the docker 910. CIOS container 912 may execute tasks that include Terraform instructions. The instructions may direct an API call to cloud services 916, which may include services available to the disconnected region 900, that may not be available via a public network (e.g., the Internet). To make the API call to cloud services 916, CIOS container 912 may transmit a request to make the API call to the signing proxy 914 that can determine if the request is valid. In response to determining the request is valid, the signing proxy 914 may make the API call to cloud services 916.

The connected CIOS central 902 may transmit a first safety plan and a configuration file to CIOS central 904 for a deployment of infrastructure resources at the execution target in the disconnected region 900. CIOS central 904 may transmit the configuration file to the scheduler 906 that may assign a task to the worker 908 to create a second safety plan based on the configuration file. The first safety plan may be created from a different configuration file that is similar or identical to the configuration file. In response to creating the second safety plan, the worker 908 may transmit the second safety plan to CIOS central 904 that may compare the first safety plan to the second safety plan. CIOS central 904 may determine, in response to the comparison, that the second safety plan is a subset of the first safety plan. In this case, the second safety plan may be automatically approved, and infrastructure resources based on the configuration file may be deployed at the execution target in the disconnected region 900. CIOS central 904 may determine that the second safety plan is not a subset of the first safety plan. In this case, the deployment may be halted, and a notification can be transmitted to a user (e.g., the user 518 of FIG. 5) that informs the user that drift may have occurred, and that the deployment is not in compliance with the second safety plan. Additionally, in this example, if the second safety plan is not a subset of the first safety plan, the connected CIOS central 902 can send instructions to the disconnected region 900 to halt any deployment that was originally planned.

Figure 10:
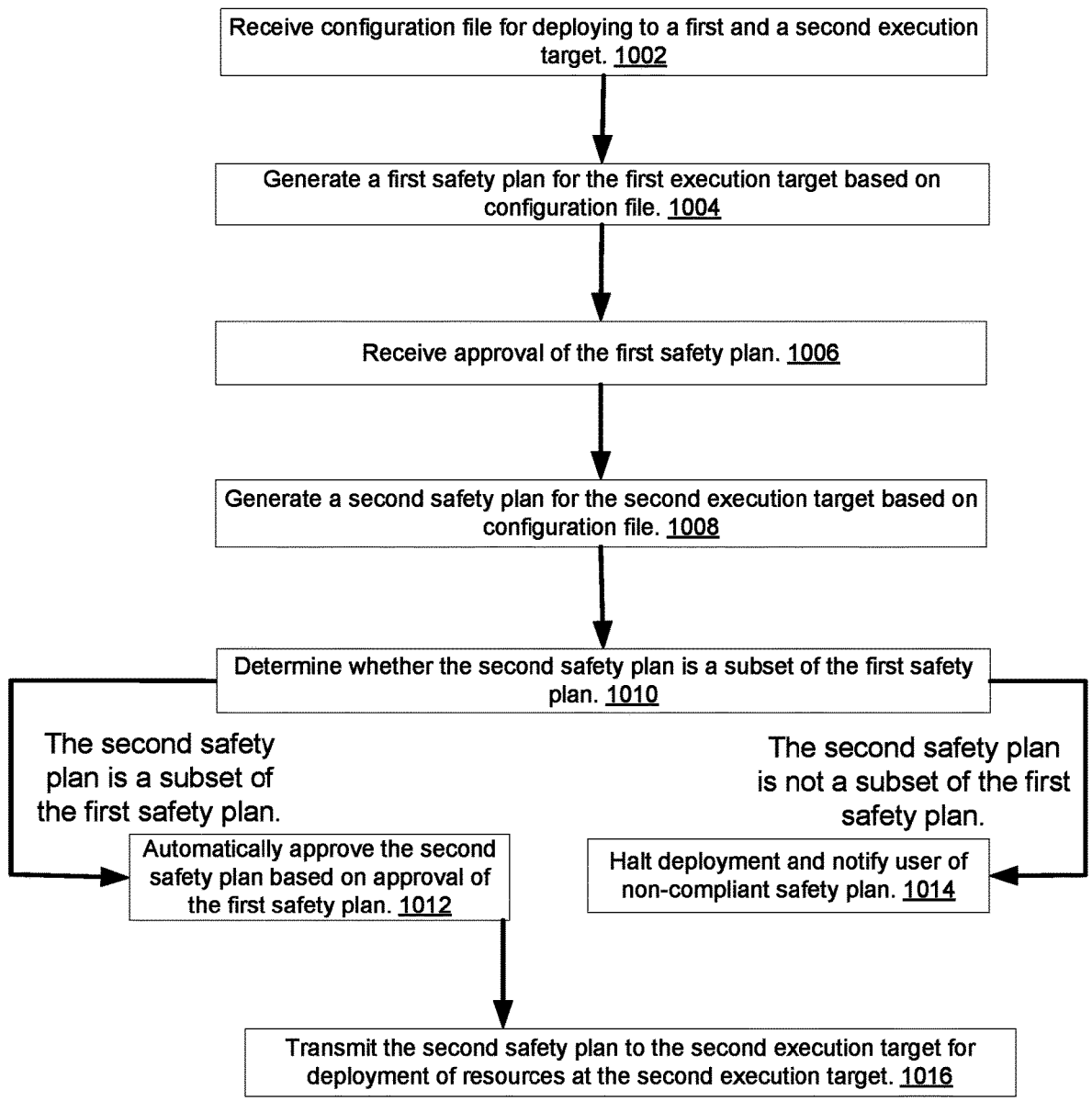
FIG. 10 is a flow chart for describing a process for using a safety plan in a disconnected region, according to at least one embodiment.

FIG. 10 illustrates an example flow diagram showing a process 1000 for implementing techniques of CIOS, according to certain embodiments of the present disclosure. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, the process 1000 may be performed under the control of one or more computing devices or computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. In some embodiments, the process 1000 may be performed by a plurality of processors in parallel. The computer-readable storage medium may be non-transitory.

FIG. 10 is a flow chart for describing a process 1000 for using a safety plan in a disconnected region, according to at least one embodiment. At block 1002, a configuration file is received for deploying infrastructure resources to a first execution target and to a second execution target. The configuration file may include infrastructure resources that a user (e.g., the user 518 of FIG. 5) may desire to deploy at the first execution target and at the second execution target. In some examples, the configuration file may contain resources for deployment at the first execution target, and a second configuration file may include resources for deployment at the second execution target.

At block 1004, a first safety plan is generated based on the configuration file. The safety plan may include a list of approved changes that the user desires to execute at the first execution target. The first safety plan may be generated by CIOS central (e.g., CIOS central 506 of FIG. 5). The first execution target may be included in a connected region. The first safety plan may be created based on a comparison of a current state of resources at the first execution target and a desired state of resources at the first execution target that may be defined in the configuration file.

At block 1006, approval of the first safety plan is received. The user may be given an option to approve the first safety plan, or the first safety plan may be automatically approved based on operations to be executed at the first execution target. In response to the approval in block 1006, infrastructure resources may be deployed at the execution target based on the configuration file.

At block 1008, a second safety plan is generated for the second execution target based on the configuration file. The second safety plan can be generated by CIOS central that can be included in a disconnected region (e.g., the disconnected region 900 of FIG. 9). Also, the second execution target may be included in the disconnected region. In some examples, the second safety plan may be created for the second execution target based on the second configuration file. In some examples, the first execution target and the second execution target may be similar or identical, and the first safety plan and the second safety plan may be similar or identical.

At block 1010, CIOS central determines whether the second safety plan is a subset of the first safety plan. CIOS central may be included in the disconnected region and may compare the approved changes in the second safety plan to the approved changes in the first safety plan. CIOS central may determine that the second safety plan is a subset of the first safety plan or that the second safety plan is not a subset of the first safety plan.

At block 1012, in accordance with CIOS central determining that the second safety plan is a subset of the first safety plan, the second safety plan is automatically approved based on the approval of the first safety plan. CIOS central may automatically approve the second safety plan without input from the user in this case since the first safety plan was already approved and since the first safety plan may have been executed successfully. In some examples, the current state of the second execution target may be similar to or identical to the desired state of the second execution target as defined in the configuration file. In this example, the second safety plan may not include changes to execute at the second execution target. The second safety plan in this case may be approved automatically by CIOS central since an empty second safety plan is a subset of the first safety plan.

At block 1014, in accordance with CIOS central determining that the second safety plan is not a subset of the first safety plan, CIOS central halts the deployment at the second execution target and notifies the user that the second safety plan is non-compliant. CIOS central may halt the deployment of infrastructure resources at the second execution target and may transmit a notification to the user informing the user that drift may have occurred and that the second safety plan is not a subset of the first safety plan. The notification may be presented to the user in a user interface that may present at least one difference between the first safety plan and the second safety plan. The notification may allow the user to (i) choose to deploy the resources despite CIOS central determining that the second safety plan is non-compliant (ii) abandon the deployment at the second execution target, (iii) submit a new configuration file for initiating a new deployment at the second execution target, or a combination thereof.

At block 1016, in response to the approval of the second safety plan by CIOS central, CIOS central transmits the second safety plan to the second execution target for deploying infrastructure resources. CIOS central and the second execution target may be included in the disconnected region. The second safety plan may include instructions for deploying resources at the second execution target. In some examples, the second safety plan may not include instructions for deploying resources since the current state of the second execution target may be similar or identical to the desired state of the execution target as defined by the configuration file. In this case, CIOS central may take no action.

Illustrative Systems

Figure 11:
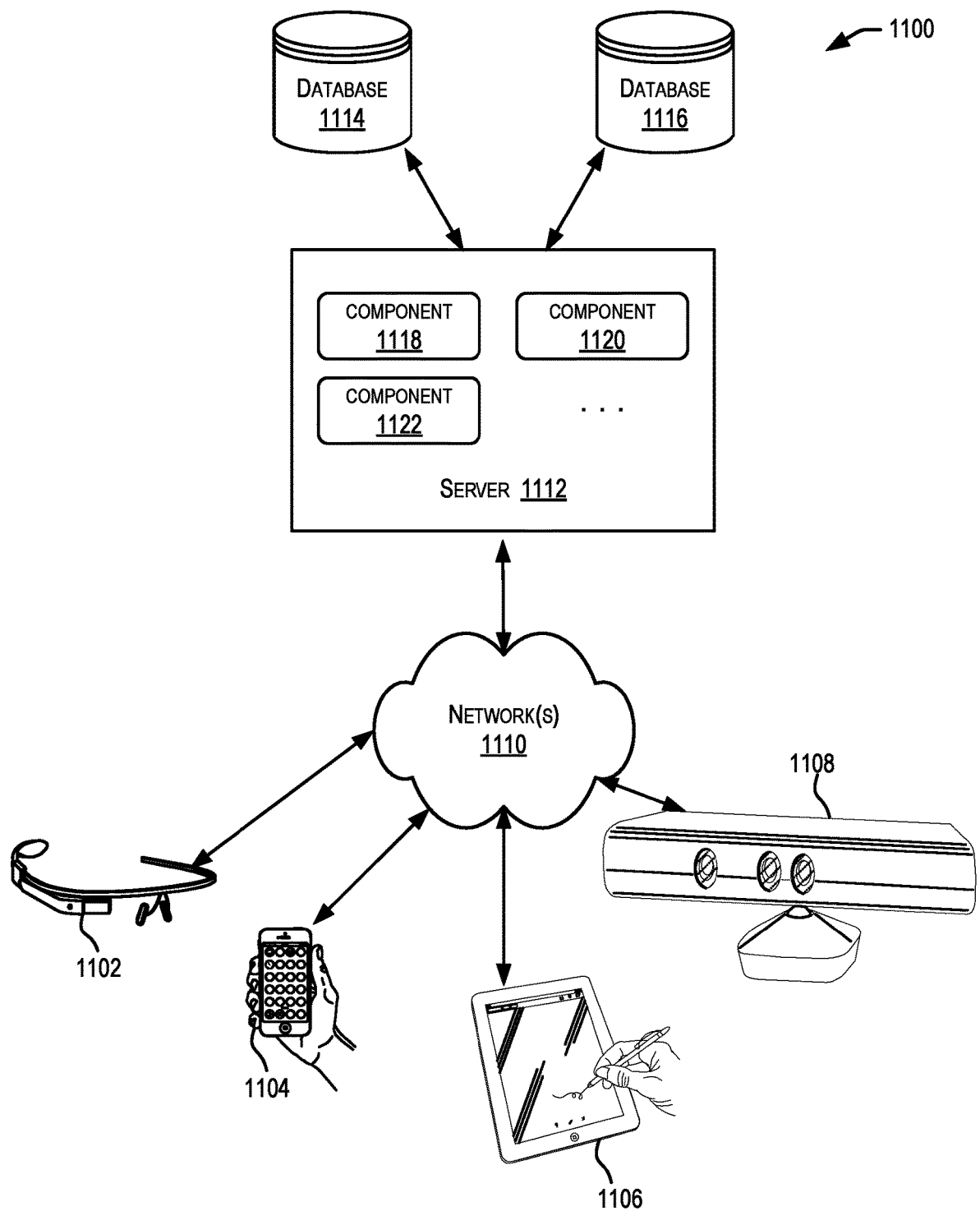
FIG. 11 is a block diagram of a distributed system, according to at least one embodiment.
Figure 12:
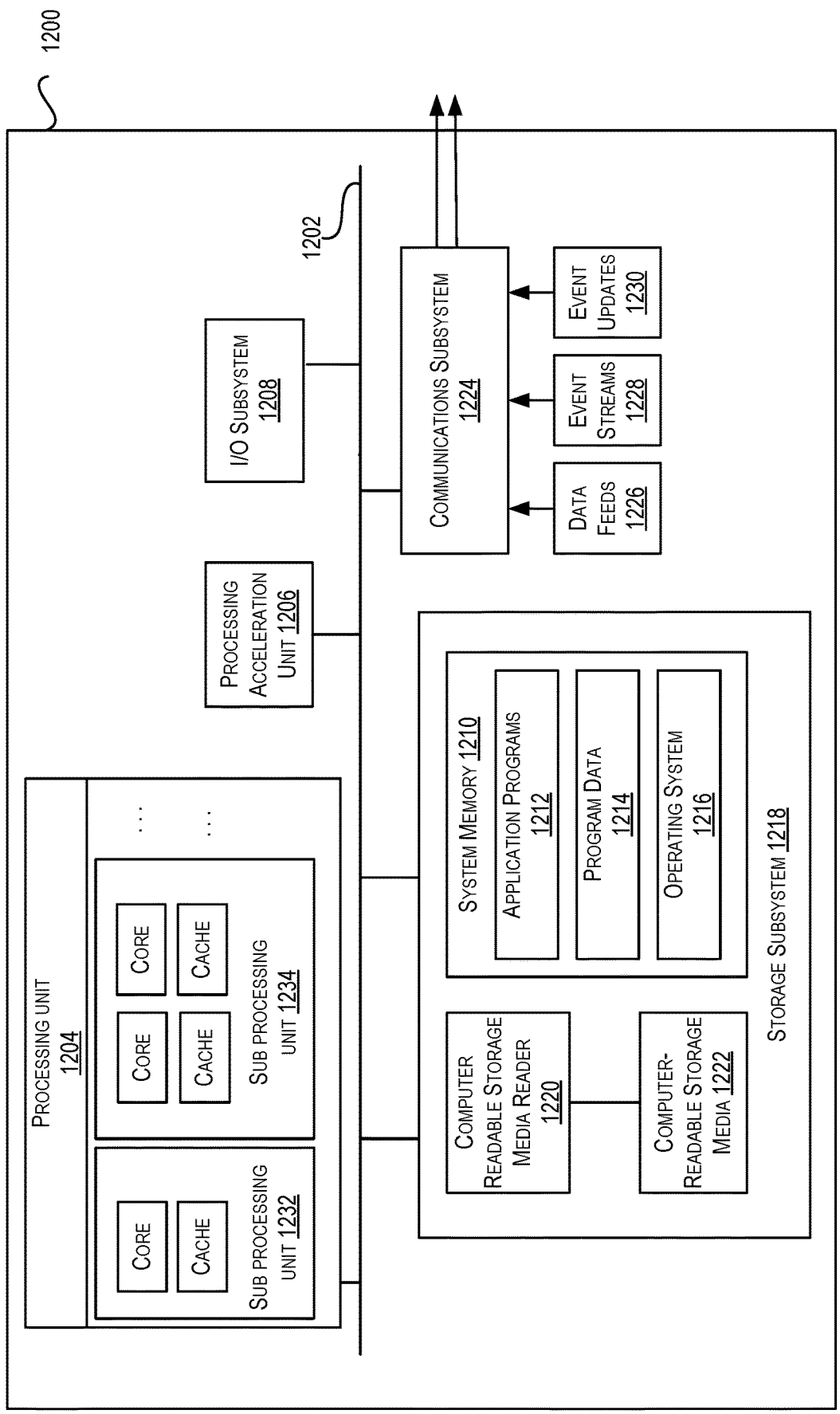
FIG. 12 is a block diagram of one or more components of a system environment by which services provided by one or more components of an embodiment system may be offered as cloud services, according to at least one embodiment.
Figure 13:
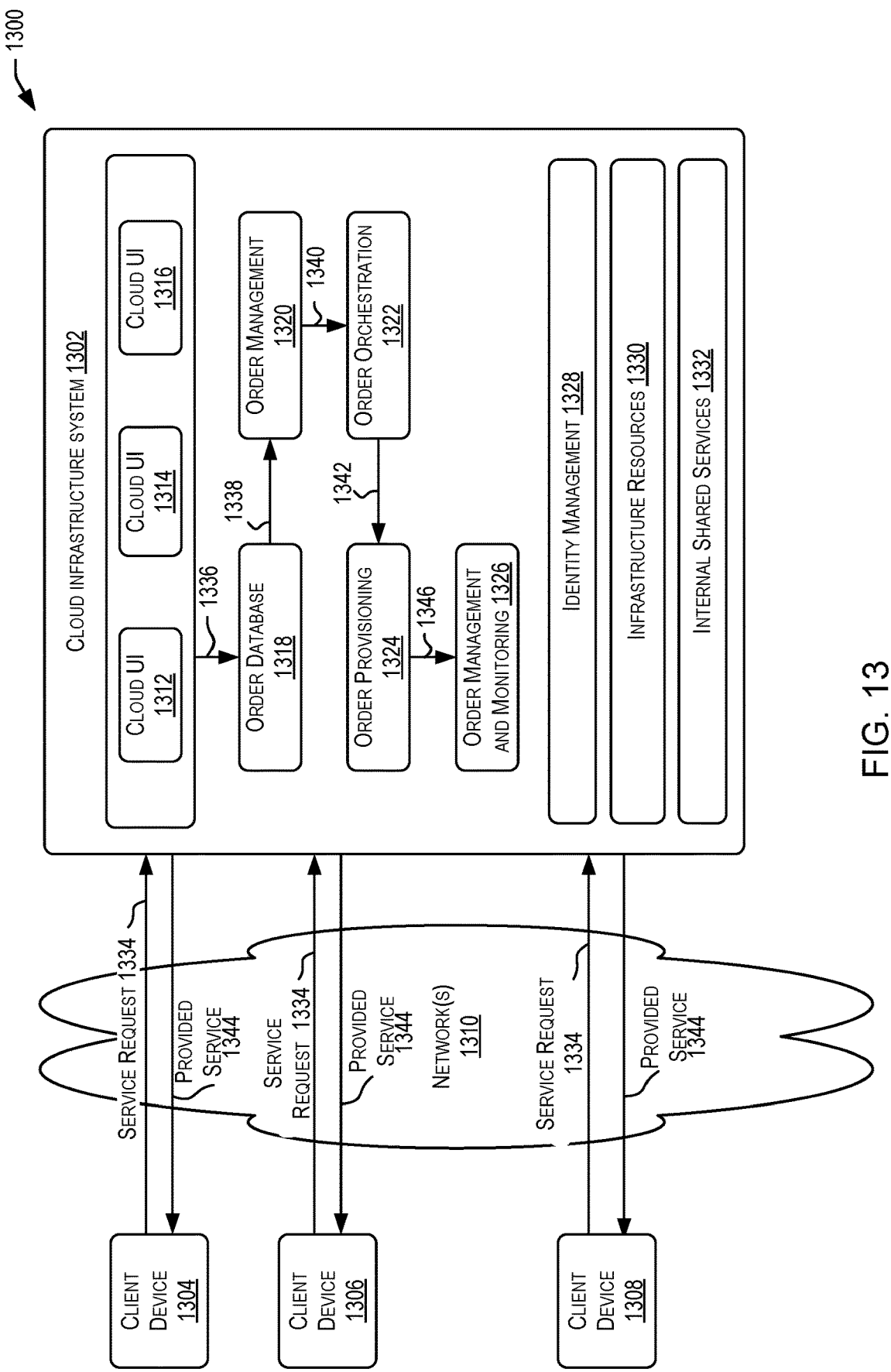
FIG. 13 is a block diagram of an example computer system, in which various embodiments of the present disclosure may be implemented.

FIGS. 11-13 illustrate aspects of example environments for implementing aspects of the present disclosure in accordance with various embodiments. FIG. 11 depicts a simplified diagram of a distributed system 1100 for implementing an embodiment of the present disclosure. In the illustrated embodiment, the distributed system 1100 includes one or more client computing devices 1102, 1104, 1106, and 1108, which are configured to execute and operate a client application such as a web browser, proprietary client (e.g., Oracle Forms), or the like over one or more network(s) 1110. The server 1112 may be communicatively coupled with the remote client computing devices 1102, 1104, 1106, and 1108 via network 1110.

In various embodiments, the server 1112 may be adapted to run one or more services or software applications such as services and applications that provide identity management services. In certain embodiments, the server 1112 may also provide other services or software applications can include non-virtual and virtual environments. In some embodiments, these services may be offered as web-based or cloud services or under a Software as a Service (SaaS) model to the users of the client computing devices 1102, 1104, 1106, and/or 1108. Users operating the client computing devices 1102, 1104, 1106, and/or 1108 may in turn utilize one or more client applications to interact with the server 1112 to utilize the services provided by these components.

In the configuration depicted in FIG. 11, the software components 1118, 1120 and 1122 of system 1100 are shown as being implemented on the server 1112. In other embodiments, one or more of the components of the system 1100 and/or the services provided by these components may also be implemented by one or more of the client computing devices 1102, 1104, 1106, and/or 1108. Users operating the client computing devices may then utilize one or more client applications to use the services provided by these components. These components may be implemented in hardware, firmware, software, or combinations thereof. It should be appreciated that various different system configurations are possible, which may be different from distributed system 1100. The embodiment shown in FIG. 11 is thus one example of a distributed system for implementing an embodiment system and is not intended to be limiting.

The client computing devices 1102, 1104, 1106, and/or 1108 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 1110.

Although distributed system 1100 in FIG. 11 is shown with four client computing devices, any number of client computing devices may be supported. Other devices, such as devices with sensors, etc., may interact with the server 1112.

The network(s) 1110 in the distributed system 1100 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 1110 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 1112 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 1112 can include one or more virtual machines running virtual operating systems, or other computing architectures involving virtualization. One or more flexible pools of logical storage devices can be virtualized to maintain virtual storage devices for the server. Virtual networks can be controlled by the server 1112 using software defined networking. In various embodiments, the server 1112 may be adapted to run one or more services or software applications described in the foregoing disclosure. For example, the server 1112 may correspond to a server for performing processing as described above according to an embodiment of the present disclosure.

The server 1112 may run an operating system including any of those discussed above, as well as any commercially available server operating system. Server 1112 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Example database servers include without limitation those commercially available from Oracle, Microsoft, Sybase, IBM (International Business Machines), and the like.

In some implementations, the server 1112 may include one or more applications to analyze and consolidate data feeds and/or event updates received from users of the client computing devices 1102, 1104, 1106, and 1108. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 1112 may also include one or more applications to display the data feeds and/or real-time events via one or more display devices of the client computing devices 1102, 1104, 1106, and 1108.

The distributed system 1100 may also include one or more databases 1114 and 1116. These databases may provide a mechanism for storing information such as user identity information, and other information used by embodiments of the present disclosure. Databases 1114 and 1116 may reside in a variety of locations. By way of example, one or more of databases 1114 and 1116 may reside on a non-transitory storage medium local to (and/or resident in) the server 1112. Alternatively, the databases 1114 and 1116 may be remote from the server 1112 and in communication with the server 1112 via a network-based or dedicated connection. In one set of embodiments, the databases 1114 and 1116 may reside in a storage-area network (SAN). Similarly, any necessary files for performing the functions attributed to the server 1112 may be stored locally on the server 1112 and/or remotely, as appropriate. In one set of embodiments, the databases 1114 and 1116 may include relational databases, such as databases provided by Oracle, that are adapted to store, update, and retrieve data in response to SQL-formatted commands.

FIG. 12 illustrates an example computer system 1200 that may be used to implement an embodiment of the present disclosure. In some embodiments, computer system 1200 may be used to implement any of the various servers and computer systems described above. As shown in FIG. 12, computer system 1200 includes various subsystems including a processing subsystem 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 may include tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processing units 1232, 1234, etc. A processing unit may include be one or more processors, including single core or multicore processors, one or more cores of processors, or combinations thereof. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1210 including potentially on one or more storage devices. Through suitable programming, processing subsystem 1204 can provide various functionalities described above for dynamically modifying documents (e.g., webpages) responsive to usage patterns.

In certain embodiments, a processing acceleration unit 1206 may be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term "input device" is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information that is used by computer system 1200. Storage subsystem 1218 provides a tangible non-transitory computer-readable storage medium for storing the basic programming and data constructs that provide the functionality of some embodiments. Software (programs, code modules, instructions) that when executed by processing subsystem 1204 provide the functionality described above may be stored in storage subsystem 1218. The software may be executed by one or more processing units of processing subsystem 1204. Storage subsystem 1218 may also provide a repository for storing data used in accordance with the present disclosure.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may be stored in the ROM. The RAM may contain data and/or program modules that are presently being operated and executed by processing subsystem 1204. In some implementations, system memory 1210 may include multiple different types of memory, such as static random access memory (SRAM) or dynamic random access memory (DRAM).

By way of example, and not limitation, as depicted in FIG. 12, system memory 1210 may store application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Computer-readable storage media 1222 may store programming and data constructs that provide the functionality of some embodiments. Software (programs, code modules, instructions) that when executed by processing subsystem 1204 a processor provide the functionality described above may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1222 may provide storage of computer-readable instructions, data structures, program modules, and other data for computer system 1200.

In certain embodiments, storage subsystem 1200 may also include a computer-readable storage media reader 1220 that can further be connected to computer-readable storage media 1222. Together and optionally, in combination with system memory 1210, computer-readable storage media 1222 may comprehensively represent remote, local, fixed, and/or removable storage devices plus storage media for storing computer-readable information.

In certain embodiments, computer system 1200 may provide support for executing one or more virtual machines. Computer system 1200 may execute a program such as a hypervisor for facilitating the configuring and managing of the virtual machines. Each virtual machine may be allocated memory, compute (e.g., processors, cores), I/O, and networking resources. Each virtual machine may run its own operating system, which may be the same as or different from the operating systems executed by other virtual machines executed by computer system 1200. Accordingly, multiple operating systems may potentially be run concurrently by computer system 1200. Each virtual machine generally runs independently of the other virtual machines.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client devices via the Internet for receiving and sending information from and to the client devices. Additionally, communication subsystem 1224 may be used to communicate notifications of successful logins or notifications to re-enter a password from the privileged account manager to the requesting users.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, communications subsystem 1224 may receive input communication in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Systems depicted in some of the figures may be provided in various configurations. In some embodiments, the systems may be configured as a distributed system where one or more components of the system are distributed across one or more networks in one or more cloud infrastructure systems.

A cloud infrastructure system is a collection of one or more server computing devices, network devices, and/or storage devices. These resources may be divided by cloud services providers and allotted to its customers in some manner. For example, a cloud services provider, such as Oracle Corporation of Redwood Shores, California, may offer various types of cloud services including but not limited to one or more services provided under Software as a Service (SaaS) category, services provided under Platform as a Service (PaaS) category, services provided under Infrastructure as a Service (IaaS) category, or other categories of services including hybrid services. Examples of SaaS services include, without limitation, capabilities to build and deliver a suite of on-demand applications such as Oracle Fusion applications. SaaS services enable customers to utilize applications executing on the cloud infrastructure system without the need for customers to purchase software for the applications. Examples of PaaS services include without limitation services that enable organizations (such as Oracle) to consolidate existing applications on a shared, common architecture, as well as the ability to build new applications that leverage the shared services provided by the platform such as Oracle Java Cloud Service (JCS), Oracle Database Cloud Service (DBCS), and others. IaaS services may facilitate the management and control of the underlying computing resources, such as storage, networks, and other fundamental computing resources for customers utilizing services provided by the SaaS platform and the PaaS platform.

FIG. 13 is a simplified block diagram of one or more components of a system environment 1300 by which services provided by one or more components of an embodiment system may be offered as cloud services, in accordance with an embodiment of the present disclosure. In the illustrated embodiment, system environment 1300 includes one or more client computing devices 1304, 1306, and 1308 that may be used by users to interact with a cloud infrastructure system 1302 that provides cloud services. The client computing devices may be configured to operate a client application such as a web browser, a proprietary client application (e.g., Oracle Forms), or some other application, which may be used by a user of the client computing device to interact with cloud infrastructure system 1302 to use services provided by cloud infrastructure system 1302.

It should be appreciated that cloud infrastructure system 1302 depicted in the FIG. may have other components than those depicted. Further, the embodiment shown in the figure is only one example of a cloud infrastructure system that may incorporate an embodiment of the disclosure. In some other embodiments, cloud infrastructure system 1302 may have more or fewer components than shown in the figure, may combine two or more components, or may have a different configuration or arrangement of components.

Client computing devices 1304, 1306, and 1308 may be devices similar to those described above for 1102, 1104, 1106, and 1108.

Although example system environment 1300 is shown with three client computing devices, any number of client computing devices may be supported. Other devices such as devices with sensors, etc. may interact with cloud infrastructure system 1302.

Network(s) 1310 may facilitate communications and exchange of data between clients 1304, 1306, and 1308 and cloud infrastructure system 1302. Each network may be any type of network familiar to those skilled in the art that can support data communications using any of a variety of commercially-available protocols, including those described above for network(s) 1110.

Cloud infrastructure system 1302 may comprise one or more computers and/or servers that may include those described above for server 1112.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." In a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1302 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 1302 may be adapted to automatically provision, manage and track a customer's subscription to services offered by cloud infrastructure system 1302. Cloud infrastructure system 1302 may provide the cloud services via different deployment models. For example, services may be provided under a public cloud model in which cloud infrastructure system 1302 is owned by an organization selling cloud services (e.g., owned by Oracle) and the services are made available to the general public or different industry enterprises. As another example, services may be provided under a private cloud model in which cloud infrastructure system 1302 is operated solely for a single organization and may provide services for one or more entities within the organization. The cloud services may also be provided under a community cloud model in which cloud infrastructure system 1302 and the services provided by cloud infrastructure system 1302 are shared by several organizations in a related community. The cloud services may also be provided under a hybrid cloud model, which is a combination of two or more different models.

In some embodiments, the services provided by cloud infrastructure system 1302 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1302. Cloud infrastructure system 1302 then performs processing to provide the services in the customer's subscription order.

In some embodiments, the services provided by cloud infrastructure system 1302 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1302 may also include infrastructure resources 1330 for providing the resources used to provide various services to customers of the cloud infrastructure system. In one embodiment, infrastructure resources 1330 may include pre-integrated and optimized combinations of hardware, such as servers, storage, and networking resources to execute the services provided by the PaaS platform and the SaaS platform.

In some embodiments, resources in cloud infrastructure system 1302 may be shared by multiple users and dynamically re-allocated per demand. Additionally, resources may be allocated to users in different time zones. For example, cloud infrastructure system 1330 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1332 may be provided that are shared by different components or modules of cloud infrastructure system 1302 and by the services provided by cloud infrastructure system 1302. These internal shared services may include, without limitation, a security and identity service, an integration service, an enterprise repository service, an enterprise manager service, a virus scanning and whitelist service, a high availability, backup and recovery service, service for enabling cloud support, an email service, a notification service, a file transfer service, and the like.

In certain embodiments, cloud infrastructure system 1302 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1302, and the like.

In one embodiment, as depicted in the figure, cloud management functionality may be provided by one or more modules, such as an order management module 1320, an order orchestration module 1322, an order provisioning module 1324, an order management and monitoring module 1326, and an identity management module 1328. These modules may include or be provided using one or more computers and/or servers, which may be general purpose computers, specialized server computers, server farms, server clusters, or any other appropriate arrangement and/or combination.

In example operation 1334, a customer using a client device, such as client device 1304, 1306 or 1308, may interact with cloud infrastructure system 1302 by requesting one or more services provided by cloud infrastructure system 1302 and placing an order for a subscription for one or more services offered by cloud infrastructure system 1302. In certain embodiments, the customer may access a cloud User Interface (UI), cloud UI 1312, cloud UI 1314 and/or cloud UI 1316 and place a subscription order via these UIs. The order information received by cloud infrastructure system 1302 in response to the customer placing an order may include information identifying the customer and one or more services offered by the cloud infrastructure system 1302 that the customer intends to subscribe to.

After an order has been placed by the customer, the order information is received via the cloud UIs, 1312, 1314 and/or 1316.

At operation 1336, the order is stored in order database 1318. Order database 1318 can be one of several databases operated by cloud infrastructure system 1318 and operated in conjunction with other system elements.

At operation 1338, the order information is forwarded to an order management module 1320. In some instances, order management module 1320 may be configured to perform billing and accounting functions related to the order, such as verifying the order, and upon verification, booking the order.

At operation 1340, information regarding the order is communicated to an order orchestration module 1322. Order orchestration module 1322 may utilize the order information to orchestrate the provisioning of services and resources for the order placed by the customer. In some instances, order orchestration module 1322 may orchestrate the provisioning of resources to support the subscribed services using the services of order provisioning module 1324.

In certain embodiments, order orchestration module 1322 enables the management of business processes associated with each order and applies business logic to determine whether an order should proceed to provisioning. At operation 1342, upon receiving an order for a new subscription, order orchestration module 1322 sends a request to order provisioning module 1324 to allocate resources and configure those resources needed to fulfill the subscription order. Order provisioning module 1324 enables the allocation of resources for the services ordered by the customer. Order provisioning module 1324 provides a level of abstraction between the cloud services provided by cloud infrastructure system 1300 and the physical implementation layer that is used to provision the resources for providing the requested services. Order orchestration module 1322 may thus be isolated from implementation details, such as whether or not services and resources are actually provisioned on the fly or pre-provisioned and only allocated/assigned upon request.

At operation 1344, once the services and resources are provisioned, a notification of the provided service may be sent to customers on client devices 1304, 1306 and/or 1308 by order provisioning module 1324 of cloud infrastructure system 1302. At operation 1346, the customer's subscription order may be managed and tracked by an order management and monitoring module 1326. In some instances, order management and monitoring module 1326 may be configured to collect usage statistics for the services in the subscription order, such as the amount of storage used, the amount data transferred, the number of users, and the amount of system up time and system down time.

In certain embodiments, cloud infrastructure system 1300 may include an identity management module 1328. Identity management module 1328 may be configured to provide identity services, such as access management and authorization services in cloud infrastructure system 1300. In some embodiments, identity management module 1328 may control information about customers who wish to utilize the services provided by cloud infrastructure system 1302. Such information can include information that authenticates the identities of such customers and information that describes which actions those customers are authorized to perform relative to various system resources (e.g., files, directories, applications, communication ports, memory segments, etc.) Identity management module 1328 may also include the management of descriptive information about each customer and about how and by whom that descriptive information can be accessed and modified.

Although specific embodiments of the disclosure have been described, various modifications, alterations, alternative constructions, and equivalents are also encompassed within the scope of the disclosure. Embodiments of the present disclosure are not restricted to operation within certain specific data processing environments, but are free to operate within a plurality of data processing environments. Additionally, although embodiments of the present disclosure have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments of the present disclosure have been described using a particular combination of hardware and software, it should be recognized that other combinations of hardware and software are also within the scope of the present disclosure. Embodiments of the present disclosure may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

What is claimed is:

1. A method, comprising:
   receiving, by a first computing system, a first configuration file for deploying a first set of infrastructure resources to a first execution target in a first region of a data center, the first configuration file identifying a target state of the first set of infrastructure resources in the first region;
   identifying, by the first computing system, a current state of the first set of infrastructure resources in the first region;
   generating, by the first computing system, a first safety plan based at least in part on the current state of the first set of infrastructure resources in the first region and the target state of the first set of infrastructure resources in the first region, the first safety plan identifying a set of operations to be executed at the first execution target;
   receiving, by the first computing system, an approval of the first safety plan based at least in part on the set of operations to be executed at the first execution target; and
   responsive to the approval, transmitting, by the first computing system, the first safety plan to the first execution target for deploying the first set of infrastructure resources at the first execution target.

2. The method of claim 1 further comprising:
   receiving, by the first computing system, a second configuration file for a deployment of a second set of infrastructure resources to a second execution target in a second region of the data center, the second configuration file identifying the target state of the second set of infrastructure resources in the second region; and generating, by the first computing system, a second safety plan for the second execution target in the second region based at least in part on the second configuration file.

3. The method of claim 2, wherein the first execution target is included in a connected region of the data center and the second execution target is included in a disconnected region of the data center.

4. The method of claim 2, further comprising:

determining, by the first computing system, that the second safety plan is a subset of the first safety plan; and responsive to determining that the second safety plan is the subset of the first safety plan, approving, by the first computing system, the second safety plan.

5. The method of claim 4, further comprising:

responsive to approving the second safety plan, transmitting, by the first computing system, the second safety plan to the second execution target for deploying the second set of infrastructure resources at the second execution target.

6. The method of claim 2, further comprising:

determining, by the first computing system, that the second safety plan is not a subset of the first safety plan; and responsive to determining that the second safety plan is not the subset of the first safety plan, halting, by the first computing system, the deployment of the second set of infrastructure resources at the second execution target.

7. The method of claim 6, further comprising:

responsive to determining that the second safety plan is not the subset of the first safety plan, transmitting, by the first computing system, a notification to a user of the first computing system, the notification comprising information identifying an occurrence of a drift between the first safety plan and the second safety plan.

8. The method of claim 7, further comprising, presenting, by the first computing system, the notification to the user via a user interface of the first computing system, wherein the notification comprises a first selectable option for enabling the user to deploy the second set of infrastructure resources at the second execution target.

9. The method of claim 8, wherein the notification further comprises a second selectable option for enabling the user to abandon the deployment of the second set of infrastructure resources at the second execution target.

10. The method of claim 9, wherein the notification further comprises a third selectable option for enabling the user to submit a new configuration file for initiating a new deployment of the second set of infrastructure resources at the second execution target.

11. A non-transitory computer-readable storage medium including instructions written thereon that, when executed by a computing system, cause the computing system to perform operations comprising:

receiving a first configuration file for deploying a first set of infrastructure resources to a first execution target in a first region of a data center, the first configuration file identifying a target state of the first set of infrastructure resources in the first region;

identifying a current state of the first set of infrastructure resources in the first region;

generating a first safety plan based at least in part on the current state of the first set of infrastructure resources in the first region and the target state of the first set of infrastructure resources in the first region, the first safety plan identifying a set of operations to be executed at the first execution target;

receiving an approval of the first safety plan based at least in part on the set of operations to be executed at the first execution target; and responsive to the approval, transmitting the first safety plan to the first execution target for deploying the first set of infrastructure resources at the first execution target.

12. The non-transitory computer-readable storage medium of claim 11, further comprising:

receiving a second configuration file for a deployment of a second set of infrastructure resources to a second execution target in a second region of the data center, the second configuration file identifying the target state of the second set of infrastructure resources in the second region; and generating a second safety plan for the second execution target in the second region based at least in part on the second configuration file.

13. The non-transitory computer-readable storage medium of claim 12, wherein the first execution target is included in a connected region of the data center and the second execution target is included in a disconnected region of the data center.

14. The non-transitory computer-readable storage medium of claim 12, further comprising:

determining that the second safety plan is a subset of the first safety plan; and responsive to determining that the second safety plan is the subset of the first safety plan, approving the second safety plan.

15. The non-transitory computer-readable storage medium of claim 14, further comprising:

responsive to approving the second safety plan, transmitting the second safety plan to the second execution target for deploying the second set of infrastructure resources at the second execution target.

16. A system comprising:

one or more memories storing instructions:

one or more processors configured to access the one or more memories and execute the instructions to at least:

receiving a first configuration file for deploying a first set of infrastructure resources to a first execution target in a first region of a data center, the first configuration file identifying a target state of the first set of infrastructure resources in the first region;

identifying a current state of the first set of infrastructure resources in the first region;

generating a first safety plan based at least in part on the current state of the first set of infrastructure resources in the first region and the target state of the first set of infrastructure resources in the first region, the first safety plan identifying a set of operations to be executed at the first execution target;

receiving an approval of the first safety plan based at least in part on the set of operations to be executed at the first execution target; and responsive to the approval, transmitting the first safety plan to the first execution target for deploying the first set of infrastructure resources at the first execution target.

17. The system of claim 16, further comprising:

receiving a second configuration file for a deployment of a second set of infrastructure resources to a second execution target in a second region of the data center, the second configuration file identifying the target state of the second set of infrastructure resources in the second region; and generating a second safety plan for the second execution target in the second region based at least in part on the second configuration file.

18. The system of claim 17, wherein the first execution target is included in a connected region of the data center and the second execution target is included in a disconnected region of the data center.

19. The system of claim 17, further comprising:

determining that the second safety plan is a subset of the first safety plan; and responsive to determining that the second safety plan is the subset of the first safety plan, approving the second safety plan.

20. The system of claim 19, further comprising:

responsive to approving the second safety plan, transmitting the second safety plan to the second execution target for deploying the second set of infrastructure resources at the second execution target.

* * * * *